United States Patent
Ding

(10) Patent No.: US 12,299,817 B2
(45) Date of Patent: May 13, 2025

(54) VIRTUAL SCENARIO GENERATION METHOD AND APPARATUS, COMPUTER DEVICE AND STORAGE MEDIUM

(71) Applicant: Tencent Technology (Shenzhen) Company Limited, Shenzhen (CN)

(72) Inventor: Zili Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 146 days.

(21) Appl. No.: 17/985,102

(22) Filed: Nov. 10, 2022

(65) Prior Publication Data
US 2023/0074265 A1 Mar. 9, 2023

Related U.S. Application Data

(63) Continuation of application No. PCT/CN2022/081332, filed on Mar. 17, 2022.

(30) Foreign Application Priority Data

Apr. 28, 2021 (CN) .......................... 202110466543.2

(51) Int. Cl.
*G06T 17/05* (2011.01)
*A63F 13/63* (2014.01)
*G06T 19/20* (2011.01)

(52) U.S. Cl.
CPC .............. *G06T 17/05* (2013.01); *A63F 13/63* (2014.09); *G06T 19/20* (2013.01); *G06T 2210/56* (2013.01)

(58) Field of Classification Search
CPC ...... G06T 17/05; G06T 2210/56; G06T 19/20; A63F 13/63
See application file for complete search history.

(56) References Cited

U.S. PATENT DOCUMENTS 10,186,049 B1 * 1/2019 Boardman ................ G06T 7/55
11,216,663 B1 * 1/2022 Ettinger ............... G05D 1/0016
(Continued)

FOREIGN PATENT DOCUMENTS

| CN | 102194022 A | 9/2011 |
| CN | 104484522 A | 4/2015 |

(Continued)

OTHER PUBLICATIONS

Zhang et al, CN104035338B—A kind of emulation mode of multiengined helicopter dynamical system Dynamic Matching, 2014, Military simulation technology research institute aviation university of air force of PLA (Year: 2014).*

(Continued)

*Primary Examiner* — YuJang Tswei
(74) *Attorney, Agent, or Firm* — Morgan, Lewis & Bockius LLP

(57) ABSTRACT

A computer device acquires three-dimensional space data and scene distribution data corresponding to a real scene. The computer device extracts terrain features from the three-dimensional space data and generates a three-dimensional terrain model according to the terrain features. The computer device extracts, from the scene distribution data, scene object features of scene objects in the real scene. The computer device generates scene object models corresponding to the scene object features in the three-dimensional terrain model to obtain a virtual scene corresponding to the real scene.

19 Claims, 19 Drawing Sheets

(56) References Cited

U.S. PATENT DOCUMENTS

| | | |
|---|---|---|
| 2011/0148866 A1 | 6/2011 | Chu et al. |
| 2014/0036037 A1* | 2/2014 | McNally .............. H04N 13/106 |
| | | 348/47 |
| 2014/0105506 A1* | 4/2014 | Drost .................... G06V 20/64 |
| | | 382/199 |
| 2014/0267393 A1* | 9/2014 | Mitchell ................ G06T 11/60 |
| | | 345/632 |
| 2014/0374933 A1* | 12/2014 | Flitsch ................ E01C 23/0966 |
| | | 425/62 |
| 2019/0373278 A1* | 12/2019 | Castaneda ........... H04N 19/172 |
| 2020/0090417 A1* | 3/2020 | Schloter .................... G06T 5/50 |
| 2021/0349922 A1* | 11/2021 | Hsu ........................ G06F 16/29 |

FOREIGN PATENT DOCUMENTS

| | | |
|---|---|---|
| CN | 107945225 A | 4/2018 |
| CN | 108021766 A | 5/2018 |
| CN | 109544684 A | 3/2019 |
| CN | 109859562 A | 6/2019 |
| CN | 111142402 A | 5/2020 |
| CN | 112150622 A | 12/2020 |
| CN | 112396688 A | 2/2021 |
| CN | 112614234 A | 4/2021 |
| CN | 113066183 A | 7/2021 |

OTHER PUBLICATIONS

Liang et al., CN104835202A—Quick three-dimensional virtual scene constructing method, Academy of Armored Forces Engineering of PLA, 2015 (Year: 2015).*

Kang et al., CN110516751A, Processing method, system and the equipment of three-dimensional data, Shanghai Jiaotong University, 2019 (Year: 2019).*

Sadeghi et al, Immersive 3D virtual reality imaging in planning minimally invasive and complex adult cardiac surgery—2020—ESC (Year: 2020).*

Tencent Technology, ISR, PCT/CN2022/081332, May 26, 2022, 3 pgs.

Tencent Technology, WO, PCT/CN2022/081332, May 26, 2022, 5 pgs.

Tencent Technology, IPRP, PCT/CN2022/081332, Oct. 24, 2023, 6 pgs.

* cited by examiner

VIRTUAL SCENARIO GENERATION METHOD AND APPARATUS, COMPUTER DEVICE AND STORAGE MEDIUM

CROSS-REFERENCE TO RELATED APPLICATIONS

This application is a continuation application of PCT Patent Application No. PCT/CN2022/081332, entitled "VIRTUAL SCENE GENERATION METHODS, DEVICES, COMPUTER EQUIPMENT AND STORAGE MEDIA" filed on Mar. 17, 2022, which claims priority to Chinese Patent Application No. 202110466543.2, filed with the State Intellectual Property Office of the People's Republic of China on Apr. 28, 2021, and entitled "VIRTUAL SCENARIO GENERATION METHOD AND APPARATUS, COMPUTER DEVICE AND STORAGE MEDIUM", all of which are incorporated herein by reference in their entirety.

FIELD OF THE TECHNOLOGY

This application relates to the field of computer vision technologies, in particular to a virtual scene generation method and apparatus, a computer device and a storage medium.

BACKGROUND OF THE DISCLOSURE

In computer graphics, virtual scenes refer to digital scenes sketched by a computer according to a digital communication technology. Along with development of a graphics technology, various imagined unreal scenes, simulation environments, etc. can be realized by establishing virtual scenes. For example, the virtual scenes can be applied to application scenes such as games and film and television special effects.

In a conventional method for establishing a virtual scene, the virtual scene can be established through independent manual modeling on each object in the virtual scene or can be randomly generated in combination with a programming tool according to specific information such as a range and a height. However, the manner of independent manual modeling on each object consumes long time, the virtual scene randomly generated in combination with programs possibly has unreasonable logic, which needs to consume longer time for manual repairing, and as a result, the efficiency of establishing the virtual scene is low.

SUMMARY

Embodiments provided by this application provide a virtual scene generation method and apparatus, a computer device and a computer-readable storage medium.

In accordance with some embodiments, a virtual scene generation method is performed by the computer device. The method includes:
acquiring three-dimensional space data and scene distribution data corresponding to a real scene;
extracting terrain features from the three-dimensional space data;
generating a three-dimensional terrain model according to the terrain features;
extracting scene object features of scene objects in the real scene from the scene distribution data; and
generating scene object models corresponding to the scene object features in the three-dimensional terrain model to obtain a virtual scene corresponding to the real scene.

In accordance with some embodiments, a virtual scene generation apparatus includes:
a data acquisition module configured to acquire three-dimensional space data and scene distribution data corresponding to a real scene;
a feature extraction module is configured to extract terrain features from the three-dimensional space data;
a terrain generation module is configured to generate a three-dimensional terrain model according to the terrain features,
the feature extraction module is further configured to extract scene object features of scene objects in the real scene from the scene distribution data; and
a scene generation module is configured to generate scene object models corresponding to the scene object features in the three-dimensional terrain model to obtain a virtual scene corresponding to the real scene.

In accordance with some embodiments, a computer device is provided. The computer device includes memory and one or more processors, the memory storing computer-readable instructions, the computer-readable instructions, when executed by the one or more processors, causing the one or more processors to perform the steps of the image processing method described above.

In accordance with some embodiments, one or more non-volatile (e.g., non-transitory) computer-readable storage media are provided, storing computer-readable instructions, the computer-readable instructions, when executed by one or more processors, causing the one or more processors to perform the steps of the image processing method described above.

In accordance with some embodiments, a computer program product includes computer-readable instructions. The computer-readable instructions, when executed by a processor, implements the steps of the image processing method described above.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

A virtual scene generation method provided by this application may be applied to a computer device. The computer device is a terminal or a server. The virtual scene generation method provided by this application may be applied to a terminal, or a server, or a system including the terminal and the server, which is implemented through interaction of the terminal and the server.

Figure 1:
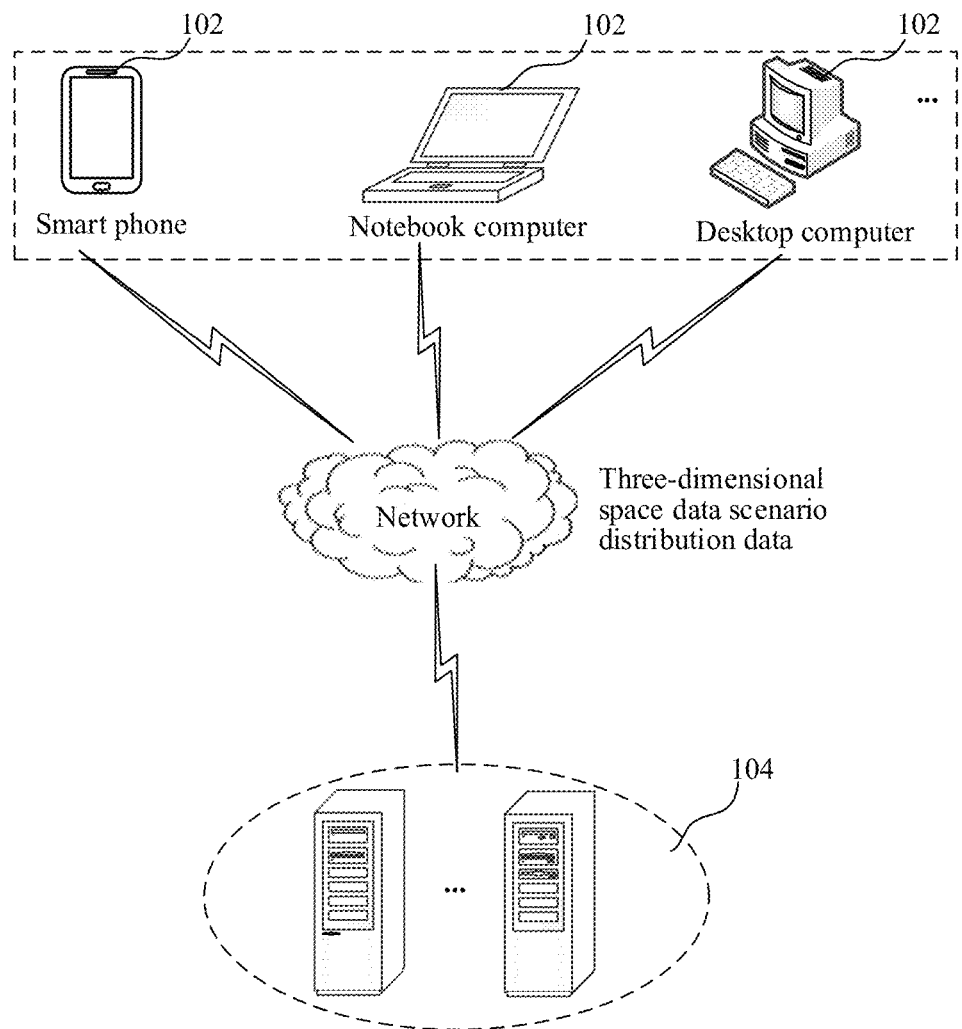
FIG. 1 is a diagram of an application environment of a virtual scene generation method according to some embodiments.

The virtual scene generation method provided by this application may be applied to an application environment shown in FIG. 1. The terminal 102 communicates with the server 104 through a network. Specifically, the terminal 102 may collect or acquire three-dimensional space data and scene distribution data corresponding to a real (e.g., real-life, tangible) scene, and transmit them to the server 104. After acquiring the three-dimensional space data and the scene distribution data corresponding to the real scene, the server 104 extracts terrain features from the three-dimensional space data. The server 104 generates a three-dimensional terrain model according to the terrain features. The server 104 extracts scene object features of scene objects in the real scene from the scene distribution data, and in the three-dimensional terrain model, generates scene object models corresponding to the scene object features, and obtains a virtual scene corresponding to the real scene. Then, the server 104 may return the virtual scene corresponding to the real scene to the terminal 102, and displays the virtual scene in the terminal 102.

The terminal 102 may be a smartphone, a tablet computer, a notebook computer, a desktop computer, a smart speaker, a smartwatch, a smart voice interaction device, a smart household appliance, and a vehicle terminal, but is not limited thereto. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 are directly or indirectly connected in a wired or wireless communication manner. This is not limited in this application.

It is to be understood that the virtual scene generation method in various embodiments of this application may effectively and automatically generate the virtual scene similar to the real scene by adopting a cloud technology, artificial intelligence, a computer vision technology, etc. The generated virtual scene may be applied to various scenes such as game development, video producing, a map field, and a traffic field such as an intelligent transportation system.

The virtual scene generation method in this application may automatically generate the virtual scene similar to the real scene based on the three-dimensional spatial data and the scene distribution data corresponding to the real scene. The generated virtual scene may be a three-dimensional road terrain simulation scene obtained by simulating and restoring road distribution, terrain distribution and other scene elements of the real scene, which may further assist in generating or completing an electronic map, thereby effectively improving precision of the electronic map.

The generated virtual scene may be a road simulation scene obtained by simulating a road environment in the real scene, thereby efficiently and accurately automatically generating a three-dimensional road simulation scene conforming to the real scene. The road simulation scene may be applied to the intelligent transportation system or a road traffic system or other scenes, and can further assist in vehicle safety control and road coordinated management, and sufficiently realize vehicle and road effective coordination so as to guarantee transportation safety and passage efficiency, thereby forming the safe, efficient and environment-friendly road traffic system.

Figure 2:
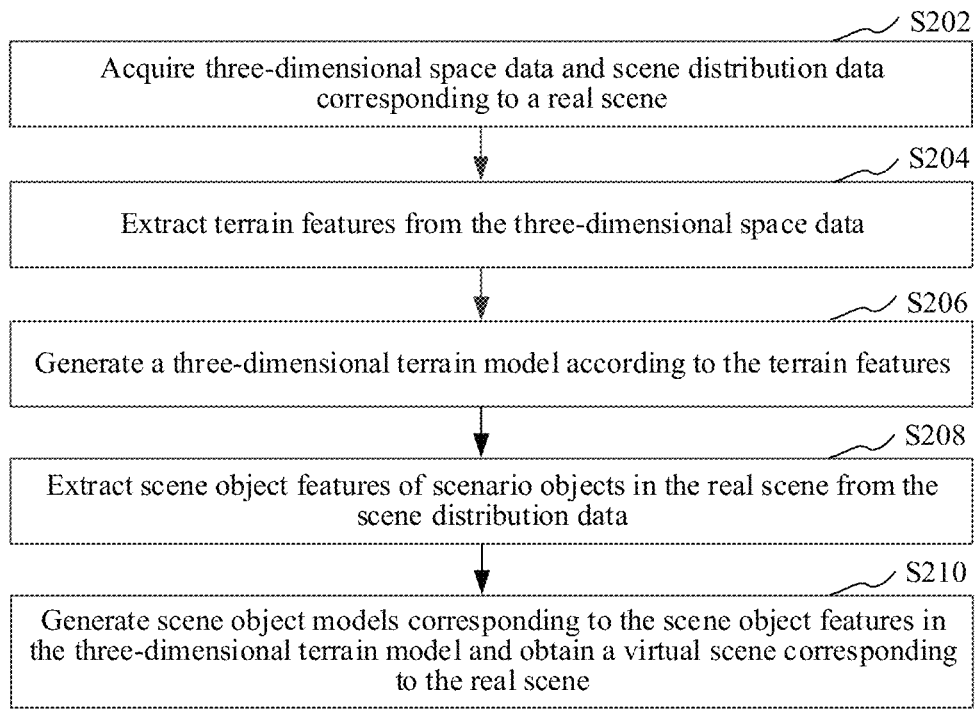
FIG. 2 is a schematic flowchart of a virtual scene generation method according to some embodiments.

In some embodiments, as shown in FIG. 2, a virtual scene generation method is provided, the method being applied to a computer device is exemplarily introduced, the computer device may specifically be a terminal or a server in FIG. 1, and the method may also be applied to a system including the terminal or the server and is implemented through interaction of the terminal and the server. The virtual scene generation method in this embodiment includes the following steps:

S202: Acquire three-dimensional space data and scene distribution data corresponding to a real scene.

Virtual scenes refer to digital scenes sketched by a computer according to a digital communication technology.

Virtual scenes can include a two-dimensional virtual scene and a three-dimensional virtual scene, and various physical forms, spatial relationships and other information in the world may be really simulated according to a virtualization technology means. The three-dimensional virtual scene may show forms of objects more attractively, and meanwhile show a virtual reality world more visually. For example, the objects in the three-dimensional virtual scene may include at least one of a terrain, trees, a road, or a building or the like.

The real scenes refer to scenes really existing in the real world, and may include at least one of a field area scene, a village and town area scene, or an urban area scene, or the like.

The three-dimensional space data may be used for showing space information of scene elements in a real scene area, such as positions, forms, size distribution and other aspects of objects, belong to quantitative description on the objects with positioning in the real scene, and may be used for constructing a three-dimensional space data model.

The three-dimensional space data may specifically be three-dimensional point set data of spatial points in the real scene, namely three-dimensional geometric data. The three-dimensional space data may specifically include at least one of three-dimensional point cloud data, three-dimensional remote sensing data, photogrammetry data, etc. The three-dimensional point cloud data may be a point data set obtained by scanning the real scene based on at least one of satellite ray scanning, ground laser scanning, radar scanning, etc. The three-dimensional remote sensing data may be target space data obtained by detecting a target based on a remote sensing technology. The photogrammetry data may include at least one of information such as a position, a shape or a size, collected by a photogrammetry technology, of a detected object.

The scene distribution data refers to distribution data of the scene elements in the real scene area, such as the position, or size distribution or other information of the object. The scene distribution data may include two-dimensional data and may also include three-dimensional data. The scene distribution data may specifically include two-dimensional position distribution information and height information of the object, such as at least one of geography data, map data, etc. Forms of the scene distribution data may include at least one of a figure form, a character form, an image form, a graph form, etc.

Specifically, the computer device firstly acquires the pre-collected three-dimensional space data and scene distribution data corresponding to the real scene, and then reestablishes the virtual scene conforming to the real scene based on the three-dimensional space data and the scene distribution data.

S204: Extract terrain features from the three-dimensional space data.

A terrain refers to a generic term of ground feature shapes and landforms, and the ground surface forms, and specifically refers to up-and-down fluctuation states jointly represented by fixed objects distributed above a terrain surface. For example, a land terrain in geography includes basic terrain forms such as a plain, a plateau, a hill, a basin and/or a mountainous region.

The terrain features refer to terrain variation features in the terrain or ground fluctuation form features. The terrain features may be used for describing information in aspects such as ground fluctuation, terrain variations, altitude variations, proportions of various terrain areas, and terrain distribution.

The three-dimensional space data includes three-dimensional space data of a plurality of spatial points, specifically such as three-dimensional coordinate data of the spatial points. A corresponding three-dimensional model may be constructed according to the three-dimensional space data of the plurality of spatial points.

Specifically, after acquiring the three-dimensional space data corresponding to the real scene, the computer device performs feature extraction on the three-dimensional space data so as to extract terrain features representing a terrain distribution state in the three-dimensional space data, specifically, such as terrain variation features.

In some embodiments, three-dimensional space data includes terrain space data, and a computer device may extract terrain features from the terrain space data. The terrain space data refers to the three-dimensional space data corresponding to the terrain points in a real scene. The terrain space data may include terrain point set data corresponding a plurality of terrain points, such as three-dimensional coordinates of the terrain points, and the three-dimensional coordinates may be represented as (x, y, z).

S206: Generate a three-dimensional terrain model according to the terrain features.

The three-dimensional terrain model is a framework for establishing a terrain environment in the virtual scene and is a basis for constructing the three-dimensional virtual scene.

For the three-dimensional point set data of the plurality of spatial points in the three-dimensional space data, each spatial point may serve as a vertex, and each vertex has corresponding space data, such as three-dimensional coordinate data. All the vertexes are connected to generate a three-dimensional terrain grid. Then, the three-dimensional terrain model with the terrain features may be generated on the basis of the three-dimensional terrain grid according to the terrain features.

Specifically, the computer device may generate the corresponding three-dimensional terrain model according to the three-dimensional space data and the terrain features after extracting the terrain features in the three-dimensional space data. Accordingly, the three-dimensional terrain model with the terrain features of the real scene can be automatically generated. S208: Extract scene object features of scene objects in the real scene from the scene distribution data.

The scene objects refer to objects in the real scene and include but not limited to buildings, or roads, or the like in the real scene. The scene object features are used for describing at least one of feature information such as positions, forms, distribution, sizes or object types or the like of the objects.

Specifically, after acquiring the scene distribution data, the computer device may perform feature extraction on the scene distribution data so as to extract the scene object features of the scene objects in the real scene. For example, the computer device may extract scene distribution data corresponding to each scene object from the scene distribution data, and for each scene object, may extract positions, forms, distribution, sizes, or object types or other features of the scene objects from the scene distribution data, and obtains the scene object features of the scene objects based on the extracted features. For example, the extracted features may be determined as the scene object features of the scene objects.

S210: Generate scene object models corresponding to the scene object features in the three-dimensional terrain model, and obtain the virtual scene corresponding to the real scene.

The scene object models refer to three-dimensional models corresponding to each scene objects. For example, if the scene objects are buildings, three-dimensional building models can be generated according to features of the buildings.

The generated three-dimensional terrain model may include terrain surface inherent object features. The terrain surface inherent object features refer to features corresponding to terrain surface inherent objects; and the terrain surface inherent objects refer to objects initially existing on the terrain surface, such as terrain surface objects and terrain surface cover objects. The complete three-dimensional terrain model can be obtained based on the terrain surface objects and the terrain surface cover objects.

The complete virtual scene corresponding to the real scene can be automatically generated by adding the scene object models corresponding to the scene object features in the three-dimensional terrain model.

Specifically, after generating the three-dimensional terrain model, the computer device may automatically generate the scene object model corresponding to each scene object according to the scene object features of the scene objects in the real scene in the scene distribution data, and add the scene object models to corresponding positions of the three-dimensional terrain model, thereby obtaining the virtual scene corresponding to the real scene.

In the above virtual scene generation method, the computer device acquires the three-dimensional space data and the scene distribution data corresponding to the real scene, extracts the terrain features from the three-dimensional space data, and automatically generates the three-dimensional terrain model according to the terrain features, thereby effectively improving the efficiency of generating the three-dimensional terrain model with the terrain features of the real scene; and extracts the scene object features of the scene objects in the real scene from the scene distribution data, generates the scene object models corresponding to the scene object features in the three-dimensional terrain model to obtain the virtual scene corresponding to the real scene, thereby automatically generating the virtual scene having the features of the real scene and conforming to real logic, and improving the efficiency of generating the virtual scene and an effect of the generated virtual scene.

A conventional method for establishing a virtual scene commonly needs to perform manual independent modeling on objects or manual repairing on the generated virtual scene, which consumes long time and causes high labor costs. However, the method for establishing the virtual scene in this application automatically generates the virtual scene having the features of the real scene and conforming to the real logic, which saves the labor costs.

In some embodiments, three-dimensional space data includes terrain space data. Extracting terrain features from the three-dimensional space data includes: determining terrain features according to a height difference between adjacent terrain points in the terrain space data.

The terrain space data refers to the three-dimensional space data corresponding to the terrain points in a real scene. The terrain space data may include terrain point set data corresponding a plurality of terrain points, such as three-dimensional coordinates of the terrain points, and the three-dimensional coordinates may be represented as (x, y, z). A computer device may generate an initial terrain model according to the terrain space data, such as a three-dimensional terrain grid.

The computer device may analyze three-dimensional coordinates of the adjacent terrain points in the terrain space data, and for each terrain point, traverses each terrain point and terrain points adjacent to the surrounding thereof and calculates the height difference. The height difference refers to a difference between heights of the two terrain points. The computer device may calculate the terrain features between the adjacent terrain points according to the height difference, and the terrain features may be terrain variation features, such as "gradient". The gradient is a sloping degree of a terrain surface unit, and a ratio of a vertical height of a slope surface to a distance in a horizontal direction is commonly called the gradient or a slope ratio.

In this embodiment, the height difference between the adjacent terrain points is important information for reflecting the terrain, and thus, the terrain features are determined according to the height difference between the adjacent terrain points in the terrain space data, thereby improving accuracy of the acquired terrain features.

In some embodiments, the step of generating a three-dimensional terrain model according to terrain features includes: Determine terrain types corresponding to terrain areas in terrain space data according to the terrain features. Add corresponding terrain surface attribute information to the terrain areas according to the terrain types. Generate the three-dimensional terrain model according to the terrain space data with the terrain surface attribute information added.

Specifically, a computer device may determine the terrain types corresponding to the terrain areas in the terrain space data according to the terrain features. Taking the terrain feature being a gradient feature as an example, a corresponding gradient threshold range may be set for each terrain type. The computer device marks terrain points with gradients being in the same gradient threshold range to belong to the same terrain area of the corresponding terrain type according to the calculated gradient between the adjacent terrain points. A formula for calculating the gradient between the adjacent terrain points may be a formula (1):

$$\text{slope} = \frac{\arccos dpo\_\text{int}\_1 \times dpo\_\text{int}\_2}{\pi} * 180° \qquad (1)$$

Slope represents the gradient between the adjacent terrain points, and dpoint_1 and dpoint_2 represent three-dimensional coordinates respectively corresponding to the terrain points. For example, the terrain type corresponding to the terrain area with the gradient threshold range being 10-90 may be a slope type; and the terrain type corresponding to the terrain area with the gradient threshold range being 0-10 may be a flat ground type.

In some embodiments, a computer device may add terrain surface attribute information corresponding to a belonging terrain type to each terrain area. The terrain surface attribute information is used for representing attributes of a terrain surface, and includes but not limited to at least one of a texture, structure attributes and other information. The texture is an attribute set for representing how model surfaces respond to light rays, namely an object texture, and includes but not limited to at least one of grain, color smoothness, transparency, reflectivity, a refractive index, luminosity and other information.

In some embodiments, a computer device may add a texture corresponding to a belonging terrain type of each terrain area. For example, a preset sand texture may be added to a terrain area of a slope type, and a preset grassland texture is added to a terrain area of a flat ground type. The computer device may add textures different in category under the corresponding terrain type for a plurality of terrain areas with the same terrain type. For example, the plurality of terrain areas with the same terrain type may be marked with variation identifications, and specifically, a random marking manner may be adopted. For example, two terrain areas belonging to the flat ground terrain type are marked as a "flat ground 1" and a "flat ground 2", and two different grassland textures are attached to the "flat ground 1" and the "flat ground 2" respectively. Accordingly, terrain changes can be effectively embodied, and the efficiency of generating the three-dimensional terrain model is improved.

Figure 3:
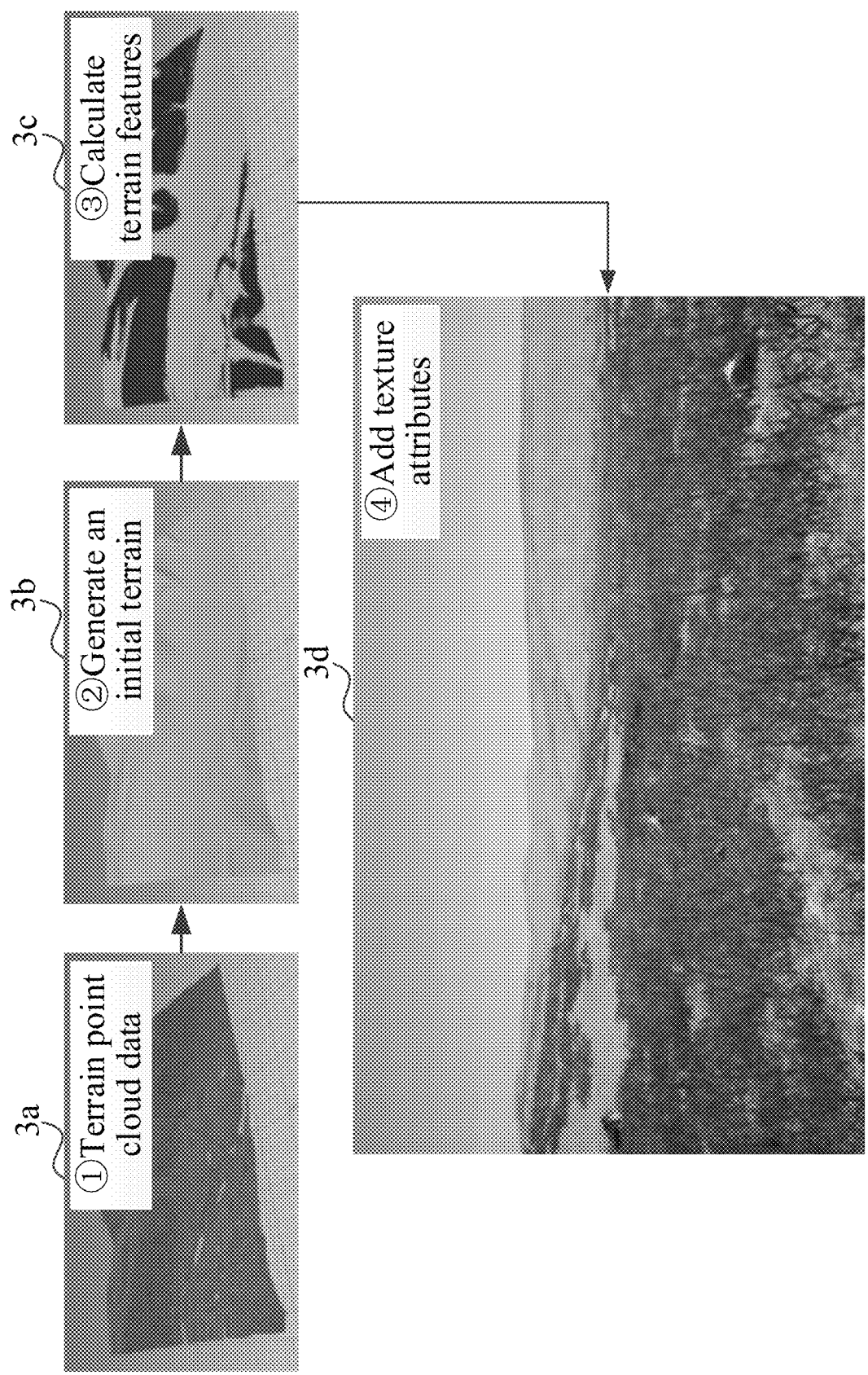
FIG. 3 is a schematic diagram of three-dimensional terrain model generation according to some embodiments.

In some embodiments, terrain space data may specifically be terrain point cloud data, and the original terrain point cloud data only includes position information of each terrain point. FIG. 3 is a schematic diagram of three-dimensional terrain model generation in some embodiments. A computer device may acquire original terrain point cloud data 3a, and generate an initial terrain 3b based on the original terrain point cloud data, and the initial terrain 3b may be generated by directly connecting the original terrain point cloud data. Terrain features 3c are extracted based on the terrain point cloud data, and terrain types corresponding to the terrain areas are marked. Then, texture attribute information corresponding to a belonging terrain type is added to each terrain area to generate a three-dimensional terrain model 3d.

In this embodiment, the terrain types corresponding to the terrain areas in the terrain space data are determined according to the terrain features, and the corresponding terrain surface attribute information is added to the terrain areas according to the terrain types, thereby automatically adding the terrain surface attribute information to the terrain surface areas, improving the efficiency of adding the terrain surface attribute information, and improving the efficiency of generating the three-dimensional terrain model.

Figure 4:
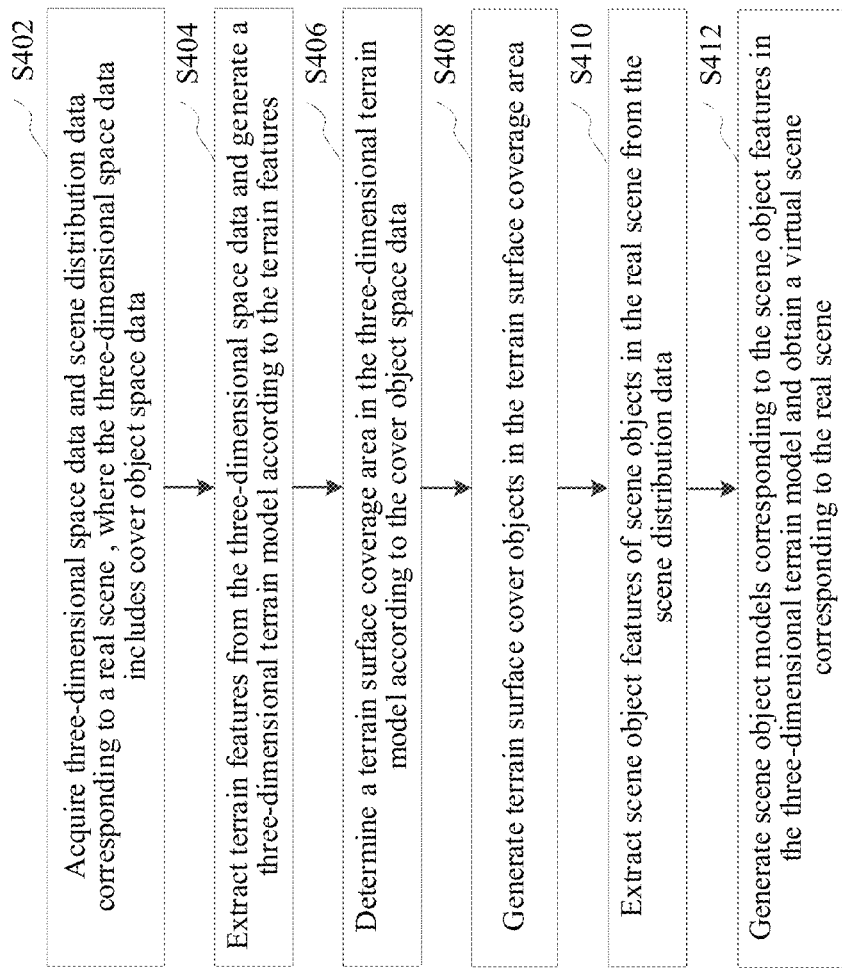
FIG. 4 is a schematic flowchart of a virtual scene generation method according to some embodiments.

In some embodiments, as shown in FIG. 4, another virtual scene generation method is provided and includes the following steps:

S402: Acquire three-dimensional space data and scene distribution data corresponding to a real scene, where the three-dimensional space data includes cover object space data.

S404: Extract terrain features from the three-dimensional space data and generate a three-dimensional terrain model according to the terrain features.

S406: Determine a terrain surface coverage area in the three-dimensional terrain model according to the cover object space data.

S408: Generate terrain surface cover objects in the terrain surface coverage area.

S410: Extract scene object features of scene objects in the real scene from the scene distribution data.

S412: Generate scene object models corresponding to the scene object features in the three-dimensional terrain model and obtain a virtual scene corresponding to the real scene.

The three-dimensional space data may be space data corresponding to inherent objects in the real scene. For example, the inherent objects of the real scene include at least one of a terrain, vegetation, etc.

The cover object space data refers to three-dimensional space data corresponding to the terrain surface cover objects on a terrain surface. The terrain surface cover objects refer to objects covering the terrain surface, and may specifically be terrain surface inherent objects such as vegetation and trees. The terrain surface coverage area refers to an area covered by the terrain surface cover objects on the terrain surface.

A computer device acquires three-dimensional space data and scene distribution data corresponding to the real scene, where the three-dimensional space data includes terrain space data and the cover object space data. The terrain space data and the cover object space data include corresponding position information which may specifically be position information under the same coordinate system.

Specifically, the computer device may perform feature extraction on the terrain space data, and generate an initial three-dimensional terrain model according to the extracted terrain features. The computer device may determine positions of the terrain surface cover objects in the three-dimensional terrain model according to the position information corresponding to the cover object space data and the terrain space data so as to determine the terrain surface coverage area of the terrain surface cover objects in the three-dimensional terrain model. The computer device may generate the terrain surface cover objects in the terrain surface coverage area, and namely three-dimensional models corresponding to the terrain surface cover objects are added to the initial three-dimensional terrain model so as to obtain a three-dimensional terrain model including the terrain surface cover objects.

In some embodiments, after generating terrain surface cover objects in a terrain surface coverage area, a computer device may add scene object models corresponding to scene object features to a three-dimensional terrain model with the generated terrain surface cover objects according to the scene object features extracted from scene distribution data, thereby automatically generating a virtual scene corresponding to a real scene, and improving the efficiency of generating the virtual scene.

In this embodiment, the terrain surface coverage area in the three-dimensional terrain model is determined according to the cover object space data, the terrain surface cover objects are generated in the terrain surface coverage area, the virtual scene corresponding to the real scene is automatically generated on the basis of the three-dimensional terrain model with the generated terrain surface cover objects, and the efficiency of generating the virtual scene is improved.

In some embodiments, the step of determining a terrain surface coverage area in a three-dimensional terrain model according to cover object space data includes: Determine terrain points corresponding to terrain surface cover points in the cover object space data in the three-dimensional terrain model. Select target terrain surface cover points according to height differences between the terrain surface cover points and the corresponding terrain points. Determine overlapping areas of expansion areas and the three-dimensional terrain model, where the expansion areas are areas obtained after expansion based on the target terrain surface cover points. Determine the terrain surface coverage area in the three-dimensional terrain model according to the overlapping areas.

Terrain space data and the cover object space data are space data in the same real scene area, may include three-dimensional coordinates corresponding to terrain points under the same coordinate system and may also include three-dimensional coordinates corresponding to terrain surface cover points.

The terrain points corresponding to the terrain surface cover points in the cover object space data refer to corresponding terrain points having overlapping positions with the terrain surface cover points. The overlapping positions may specifically refer to that the terrain surface cover points have the same plane position information with the terrain points. For example, the terrain surface cover points and the terrain points include corresponding (x, y, z) coordinate information, and if the terrain surface cover points and the terrain points are the same in (x, y) coordinate information, it indicates that the terrain points are the corresponding terrain points having the overlapping positions with the terrain surface cover points.

The overlapping areas refer to intersected areas between areas obtained after expanding the target terrain surface cover points and areas corresponding to the terrain points in the three-dimensional terrain model.

In some embodiments, a computer device may generate a three-dimensional terrain model according to terrain space data, and determine terrain points corresponding to terrain surface cover points in the three-dimensional terrain model according to three-dimensional coordinates corresponding to terrain points in the terrain space data and three-dimensional coordinates corresponding to terrain surface cover points in cover object space data. The terrain points corresponding to the terrain surface cover points in the three-dimensional terrain model refer to terrain points covered by the terrain surface cover points in the three-dimensional terrain model. The computer device may select needed target terrain surface cover points according to height differences between the terrain surface cover points and the corresponding terrain points.

In some embodiments, a computer device may determine terrain points corresponding to terrain surface cover points in cover object space data according to (x, y) coordinate information in (x, y, z) coordinate information corresponding to the terrain surface cover points and the terrain points. Three-dimensional coordinates may utilize z-axis coordinate information for representing height information. The computer device may calculate height differences between the terrain surface cover points and the corresponding terrain points according to the z-axis coordinate information corresponding to the terrain surface cover points and the terrain points, and determine the terrain surface cover points with the height difference meeting a selection condition as target terrain surface cover points.

For example, a height difference computational formula for the terrain surface cover points and the corresponding terrain points may be as below:

$$\text{foliage}[n].\text{height} = \text{foliage}[n].y - \text{ground}(\text{foliage}[n].x, \text{foliage}[n].z).y,$$

where, n represents a serial number of a terrain surface cover point, foliage[n] represents an nth terrain surface cover point, and foliage[n].height represents a height difference between a terrain surface cover point and a corresponding terrain point, namely a height of the terrain surface cover point relative to the corresponding terrain point; and foliage[n_].y represents a coordinate of a vegetation point n in a y-axis, and ground (foliage[n].x, foliage[n].z).y represents a y-axis coordinate corresponding to a terrain point the same as the terrain surface cover point n in x-axis and z-axis coordinate.

In some embodiments, a computer device may expand each selected target terrain surface cover point to obtain an expansion area. Expansion refers to continuous enlarging and increasing on the original basis. Expansion treatment on the target terrain surface cover points also means expansion into an area with a preset range based on the target terrain surface cover points.

For example, expansion treatment on the target terrain surface cover points includes at least one of plane expansion, sphere expansion, cone expansion treatment, etc. on the target terrain surface cover points. Plane expansion treatment refers to that each target terrain surface cover point being as a center is directly expanded into an area with a preset range, and then an expansion area is obtained. Sphere expansion treatment refers to that each target terrain surface cover point being as a sphere center is expanded into a corresponding sphere model according to a preset expansion parameter, namely a sphere radius, and the expanded sphere model is an expansion area corresponding to each target terrain surface cover point. Cone expansion treatment refers to that each target terrain surface cover point being as a cone vertex is expanded into a corresponding cone model such as a circular cone model according to a preset cone expansion parameter, and the expanded cone model is an expansion area corresponding to each target terrain surface cover point.

In some embodiments, a computer device may determine overlapping areas of expansion areas corresponding to target terrain surface cover points and a three-dimensional terrain model, and determine a final terrain surface coverage area in the three-dimensional terrain model according to the overlapping areas. For example, the computer device may determine terrain areas, located at the same plane with the three-dimensional terrain model, of the expansion areas as the overlapping areas, and namely, determines terrain areas corresponding to terrain points consistent to (x, y) coordinate information corresponding to the expansion areas as the overlapping areas. In some embodiments, if expansion areas include corresponding (x, y, z) coordinate information, terrain areas corresponding to terrain points consistent to (x, y, z) coordinate information corresponding to the expansion areas may be determined as overlapping areas.

In some embodiments, a computer device may further eliminate position areas, including scene objects, in overlapping areas in corresponding position areas in a three-dimensional terrain model according to scene objects in scene distribution data. Furthermore, the computer device may eliminate terrain areas with a terrain gradient exceeding a preset threshold, such as terrain areas with a terrain gradient greater than 75 degrees in the three-dimensional terrain model out of the overlapping areas. The computer device may determine the overlapping area without the scene object position areas and the terrain areas with the terrain gradient exceeding the preset threshold as a final terrain surface coverage area in the three-dimensional terrain model.

In this embodiment, cover object space data corresponding to a real scene may have noisy points. Taking the cover object space data being vegetation point cloud data as an example, one plant may be composed of a plurality of points, and direct generating terrain surface cover objects according to the vegetation point cloud data may cause many redundant terrain surface cover objects. Thus, after the target terrain surface cover points are selected according to the height differences between the terrain surface cover points and the corresponding terrain points, the terrain surface coverage area in the three-dimensional terrain model is re-determined according to the overlapping areas of the expansion areas corresponding to the target terrain surface cover points and the three-dimensional terrain model, and accordingly, the terrain surface cover objects are generated in the terrain surface coverage area, thereby more accurately generating the terrain surface cover objects being similar to the real scene and conforming to a distributed logic.

In some embodiments, the step of generating terrain surface cover objects in a terrain surface coverage area includes: Determine generation parameter information of the terrain surface cover objects in the terrain surface coverage area. Generate the terrain surface cover objects in the terrain surface coverage area according to the generation parameter information.

The generation parameter information of the terrain surface cover objects refers to parameters for generating the terrain surface cover objects, and may include at least one of parameter information such as a generation quantity, generation positions, and terrain surface cover object sizes or distribution forms.

In some embodiments, a computer device may generate terrain surface cover objects in a terrain surface coverage area after determining the terrain surface coverage area in a three-dimensional terrain model. Specifically, the computer device may determine generation parameter information of the terrain surface cover objects in the terrain surface coverage area according to a preset generation manner. For example, generation parameter information of terrain surface cover objects corresponding to an area size may be determined according to the area size of the terrain surface coverage area, and the generation parameter information of the terrain surface cover objects in the terrain surface coverage area may be randomly generated.

In some embodiments, a computer device may determine generation positions of terrain surface cover objects in a terrain surface coverage area according to generation parameter information, acquire three-dimensional models corresponding to preset terrain surface cover objects matched with the generation parameter information, and add the three-dimensional models of the terrain surface cover objects to the generation positions of the terrain surface cover objects in the terrain surface coverage area, thereby generating the terrain surface cover objects in the terrain surface coverage area.

In some embodiments, a computer device may generate terrain surface cover objects in a terrain surface coverage area in a scattered point manner. For example, the computer device may determine generation points and generation parameter information of the terrain surface cover objects in the terrain surface coverage area, three-dimensional models corresponding to the pre-drawn terrain surface cover objects matched with the generation parameter information are added to the generation points in the terrain surface coverage area, thereby generating the terrain surface cover objects in the terrain surface coverage area.

Figure 5:
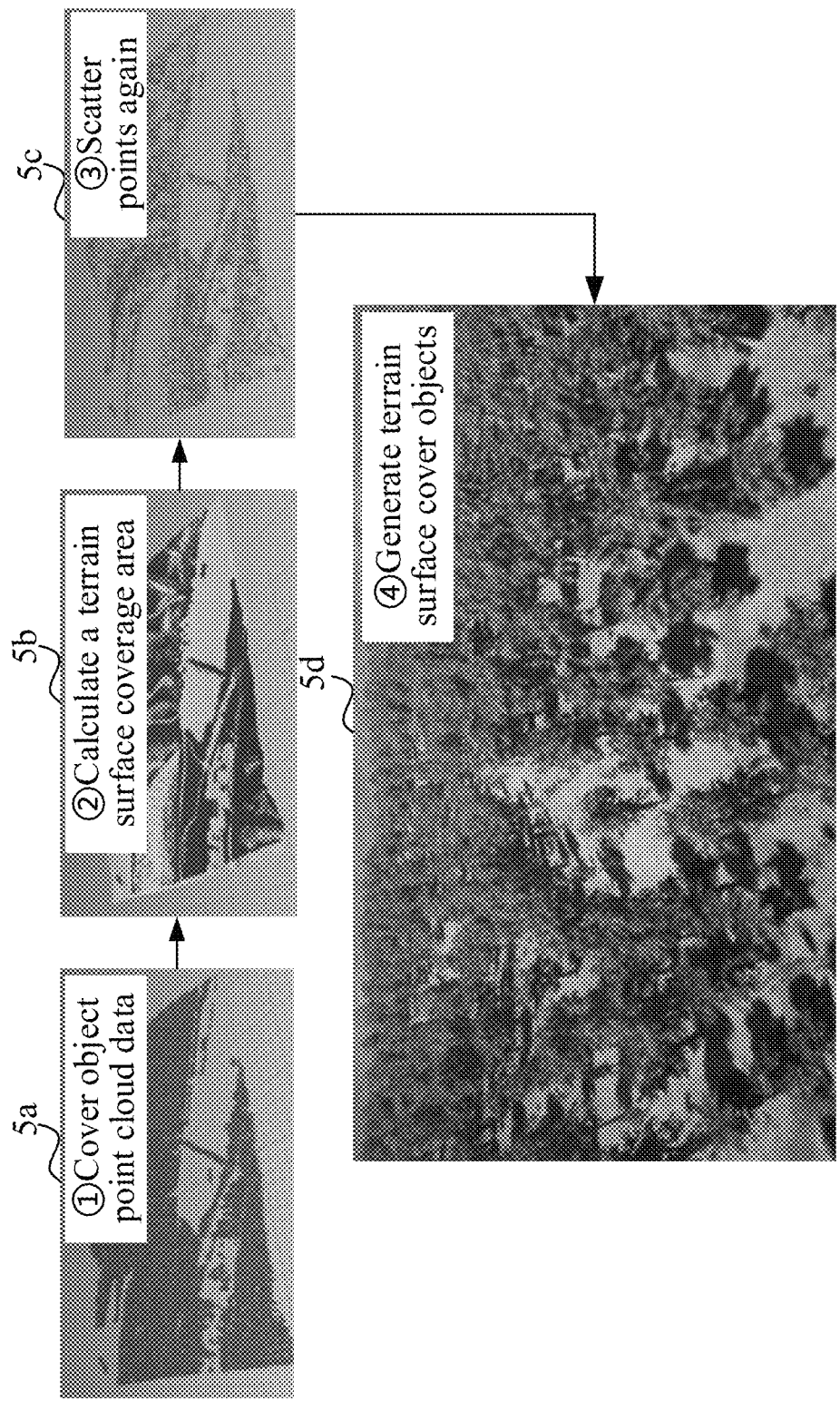
FIG. 5 is a schematic diagram of generating terrain surface cover objects in a three-dimensional terrain model according to some embodiments.

In some embodiments, cover object space data may be cover object point cloud data. Taking the cover object point cloud data being vegetation point cloud data as an example, FIG. 5 is a schematic diagram of generating terrain surface cover objects in a three-dimensional terrain model in some embodiments. After acquiring original cover object point cloud data 5a, a computer device calculates a terrain surface coverage area 5b in a three-dimensional terrain based on the original cover object point cloud data 5a, point scattering is performed in the terrain surface coverage area 5b again so as to determine generation points 5c of the terrain surface cover objects in the terrain surface coverage area, the terrain surface cover objects are generated in the three-dimensional terrain model based on the generation points 5c of the terrain surface cover objects, and thus, the three-dimensional terrain model 5d with the generated terrain surface cover objects is obtained.

In this embodiment, the generation parameter information of the terrain surface cover objects in the terrain surface coverage area is determined; and the terrain surface cover objects are generated in the terrain surface coverage area according to the generation parameter information so as to more accurately generate the terrain surface cover objects being similar to a real scene and conforming to a distributed logic.

In some embodiments, the step of extracting scene object features of scene objects in a real scene from scene distribution data includes: Determine positions and heights of the scene objects in the real scene in a three-dimensional terrain model based on the scene distribution data. Generate three-dimensional scene object data corresponding to the scene objects according to the positions and the heights. Extract the scene object features of the scene objects from the three-dimensional scene object data.

The scene distribution data may include distribution data of scene points in the real scene and may also include object structure distribution data. For example, the scene distribution data may include at least one of map data or OpenStreetMap (OSM) data (open source road and terrain distribution data), etc. A form of the scene distribution data may include any one of an image form, an array form and an Extensible Markup Language (XML) form.

The three-dimensional scene object data corresponding to the scene objects may represent three-dimensional space data corresponding to the scene objects. Specifically, the scene distribution data may include two-dimensional original position data.

In some embodiments, a computer device may acquire scene distribution data, and extract distribution data of scene objects in a real scene from the scene distribution data. The distribution data includes at least one of an original position, an original height, etc. The height refers to a distance from a ground or a datum plane upwards to a certain position, namely a distance from a bottom of an object to a top end of the object. The original height of the scene objects in the real scene is the distance from bottoms of the scene objects to top ends of the scene objects. The computer device may only extract the original position in the scene distribution data of the needed scene objects. The needed scene objects may include at least one of buildings, roads, etc.

In some embodiments, a computer device may determine positions and heights of scene objects in a three-dimensional terrain model according to original positions of the scene objects. The computer device may further determine the positions and the heights of the scene objects in the three-dimensional terrain model according to the original positions and original heights of the scene objects, thereby obtaining three-dimensional data of the scene objects.

In some embodiments, a computer device may generate three-dimensional space data of scene objects according to positions and heights of the scene objects in a three-dimensional terrain model, such as three-dimensional coordinates corresponding to the scene objects. The computer device may convert the positions and the heights of the scene objects in the three-dimensional terrain model into three-dimensional point cloud data. Accordingly, the three-dimensional space data of the scene objects in a three-dimensional terrain can be accurately obtained. The computer device may extract scene object features of the scene objects from three-dimensional scene object data, and the scene object features may include but not limited to at least one of a position, a size, a type, a normal and other features, thereby generating a final three-dimensional scene object model. Accordingly, the three-dimensional scene object model matched with the scene objects in the real scene can be rapidly and accurately generated.

In this embodiment, the positions and the heights of the scene objects in the three-dimensional terrain model can reflect the features of the scene objects, and thus, the positions and the heights of the scene objects in the real scene in the three-dimensional terrain model are determined on the basis of the scene distribution data; the three-dimensional scene object data corresponding to the scene objects are generated on the basis of the determined positions and heights; and the scene object features of the scene objects are extracted from the three-dimensional scene object data, thereby improving accuracy of the extracted scene object features.

In some embodiments, the step of determining positions and heights of scene objects in a real scene in a three-dimensional terrain model based on scene distribution data includes: Determine the positions and the heights of the scene objects in the three-dimensional terrain model according to original positions if the scene distribution data includes the original positions of the scene objects in the real scene.

The scene distribution data may include two-dimensional position data of scene points or object structures, and may also include two-dimensional position data and height data of scene points or object structures. For example, the scene distribution data may include at least one of two-dimensional map data or height data. The height data may be height data, acquired from a scene distribution database, of various scene points or object structures, and may also be height data pre-marked for the scene points or object structures according to the map data.

Specifically, after acquiring the scene distribution data, the computer device may determine the positions and the heights of the scene objects in the three-dimensional terrain model according to the original positions if the scene distribution data includes the original positions of the scene objects in the real scene. For example, the computer device may allocate corresponding heights to the scene objects according to area sizes corresponding to object types and the original positions of the scene objects. The computer device may randomly allocate heights to the scene objects according to a height range corresponding to the object types, and may allocate matched heights according to the area sizes.

In this embodiment, if the scene distribution data includes the original positions of the scene objects in the real scene, the positions and the heights of the scene objects in the three-dimensional terrain model are determined according to the original positions, and thus the position and height determining flexibility is improved.

In some embodiments, the method further includes the following step: Determine positions and heights of scene objects in a three-dimensional terrain model according to original positions and original heights if scene distribution data includes the original positions and the original heights of the scene objects.

Specifically, if scene distribution data includes original positions and original heights of scene objects, a computer device directly determines positions and heights of the scene objects in a three-dimensional terrain model according to the original positions and the original heights, thereby efficiently and accurately generating scene object models conforming to the scene objects in a real scene in the three-dimensional terrain model.

In this embodiment, if the scene distribution data includes the original positions and the original heights of the scene objects, the positions and the heights of the scene objects in the three-dimensional terrain model are determined according to the original positions and the original heights, and thus the position and height determining flexibility is improved.

In some embodiments, the step of generating scene object models corresponding to scene object features in a three-dimensional terrain model to obtain a virtual scene corresponding to a real scene includes: Generate initial scene object models corresponding to scene objects according to the scene object features. Add scene object attribute information conforming to object types to the initial scene object models according to the object types of the scene objects to obtain scene object models matched with the scene objects. Add the scene object models to the three-dimensional terrain model to obtain the virtual scene corresponding to the real scene.

The scene object attribute information is used for representing attribute information of surfaces of the scene object models, and the scene object attribute information may include at least one of information such as a texture and structure attributes. The computer device may add the attribute information to model surfaces of three-dimensional geometric models of the scene objects, thereby obtaining complete scene object models corresponding to the scene objects.

In some embodiments, a computer device may extract scene object features corresponding to needed scene objects from scene distribution data, and automatically construct corresponding three-dimensional geometric models according to the scene object features. The scene object features may include at least one of feature information such as a position, a size, a normal and a type of each point in the scene objects, and the computer device may generate initial three-dimensional geometric models, namely initial scene object models according to the scene object features of each point in the scene objects.

In some embodiments, a computer device may add attribute information corresponding to an object type to each initial scene object model so as to generate a complete scene object model. For example, relatively complete scene object models with texture attributes are obtained by adding corresponding texture information to the initial scene object models. The computer device may add the scene object models to corresponding positions in a three-dimensional scene, and then a virtual scene including scene objects is obtained.

Figure 6:
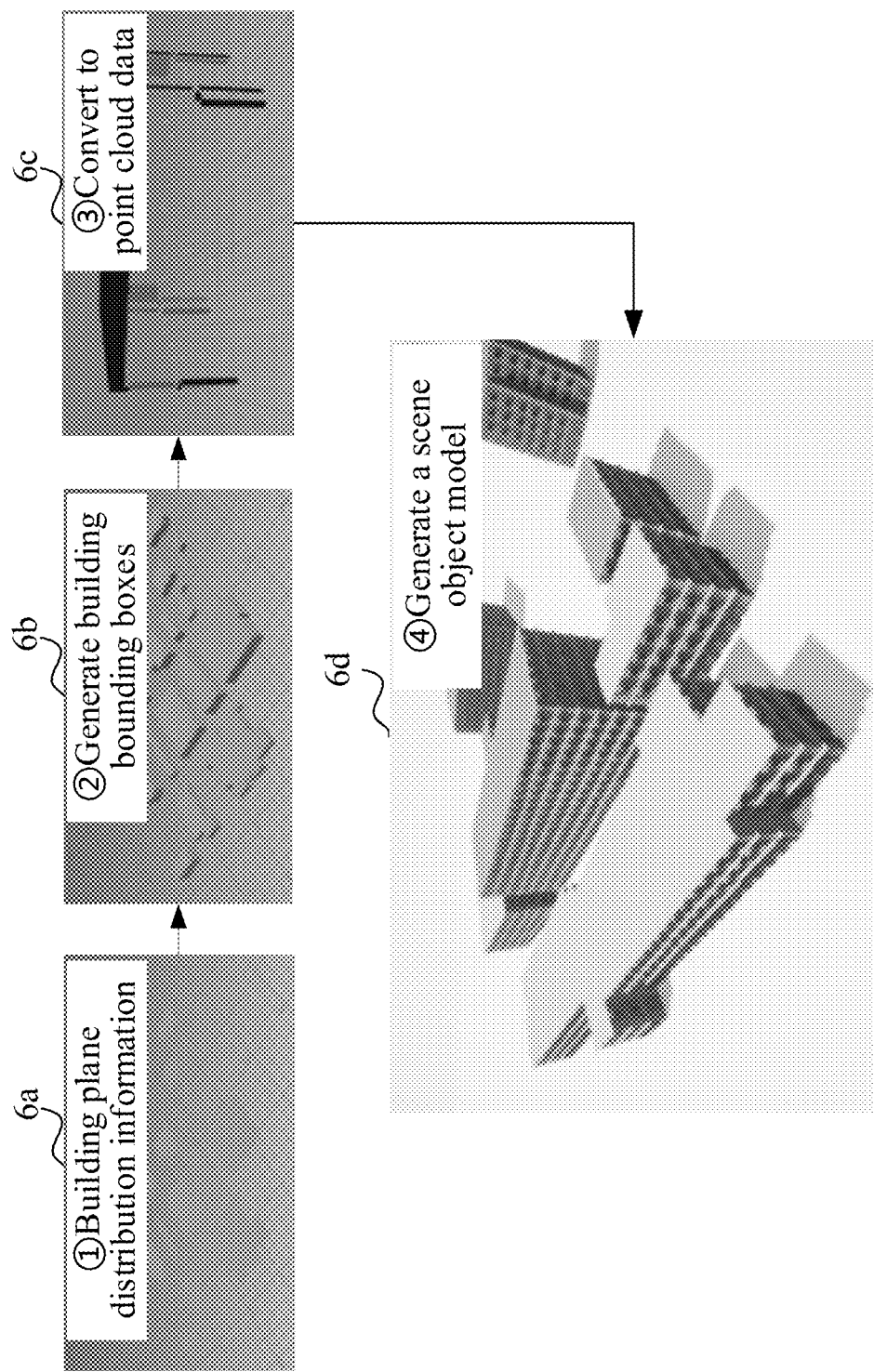
FIG. 6 is a schematic diagram of scene object model generation according to some embodiments.

In some embodiments, scene distribution data includes plane distribution information of scene objects. Taking the scene objects being buildings as an example, FIG. 6 is a schematic diagram of scene object model generation in some embodiments. The computer device acquires the plane distribution information 6a of the buildings from the scene distribution data, and the plane distribution information may include at least one of a location area or heights of the buildings. The computer device may generate building bounding boxes 6b corresponding to the buildings according to the location area or the heights of the buildings. For example, the computer device may perform stretching by corresponding heights based on the location area of the buildings to generate the three-dimensional building bounding boxes. The bounding boxes refer to rectangular boxes externally tangent to the scene objects. The computer device may convert the bounding boxes corresponding to the buildings into three-dimensional space data corresponding to the buildings, such as corresponding point cloud data 6c, and corresponding scene object features are marked for each point. The scene object features include at least one of a position, a size, a normal, building attributes, etc., where the building attributes include at least one of attribute information such as the number of floors, a roof, a wall, a corner and an eave. The computer device then generates three-dimensional initial scene object models 6d according to the point cloud data 6c of the buildings.

The plane distribution information of the buildings may include distribution information corresponding to a plurality of points in a plane of the location area of the buildings, such as two-dimensional coordinate information. When the plane distribution information of the buildings is converted into the three-dimensional space data corresponding to the buildings, each point on the plane can be duplicated, and specifically point duplication may be performed according to the heights of the buildings, thereby obtaining an updated point set of the buildings. For example, an original point set and a duplicated point set of the buildings may be named as point and dpoint and located in the same bounding box geometry, and then perform following treatment:

dpoint[n].y=point[n].y+point[n].height, where, n represents a serial number of a central point of the building points, dpoint[n].y represents coordinates of a duplicated point, point[n].y represents coordinates of an original point, and point[n].height represents height information of the original point. Point duplication is performed according to the heights of the buildings, thereby obtaining three-dimensional point set data of the buildings.

For example, the computer device may also adopt a bounding box processing tool in three-dimensional computer graphic software, such as a bounding box processing tool in Houdini software, to convert geometries different in shape into averagely-distributed point sets. Accordingly, relatively accurate three-dimensional point set data of the buildings are obtained, and building models are generated. Then, building attribute information and texture attribute information are added to the three-dimensional point set data, and accordingly, corresponding textures are attached to the building models according to different kinds of building attribute information, thereby generating the scene object models matched with the scene objects.

In this embodiment, the initial scene object models corresponding to the scene objects are generated according to the scene object features, scene object attribute information conforming to the object types is added to the initial scene object models according to the object types of the scene objects to obtain the scene object models matched with the scene objects, and accordingly, the three-dimensional scene object models corresponding to the scene objects can be effectively generated, thereby efficiently and accurately generating a virtual scene similar to a real scene.

In some embodiments, the step of adding scene object models to a three-dimensional terrain model to obtain a virtual scene corresponding to a real scene includes: Determine corresponding terrain areas of the scene object models in the three-dimensional terrain model. Perform smoothing treatment on the terrain areas to obtain smoothened terrain areas. Add the scene object models to the smoothened terrain areas in the three-dimensional terrain model to obtain the virtual scene corresponding to the real scene.

The corresponding terrain areas of the scene object models in the three-dimensional terrain model refer to terrain areas corresponding to location areas of the scene object models in the three-dimensional terrain model.

Terrains in the terrain areas may be uneven terrains. The terrain in the terrain area corresponding to each complete scene object model needs to be flat, and in other words, the corresponding terrain areas need to be located in the same plane. Smoothing treatment refers to flattening treatment on the terrains in the terrain areas into the terrains in the same plane.

Specifically, in a process that a computer device generates and adds the scene object models to the three-dimensional terrain model, the terrain areas corresponding to the scene object models in the three-dimensional terrain model are firstly determined, and then smoothing treatment is performed on the corresponding terrain areas. Specifically, the computer device may perform smoothing treatment on the corresponding terrain areas according to three-dimensional space data of bottom faces of the scene object models, and in other words, terrain points in the corresponding terrain areas and points on the bottom faces of the scene object models are arranged in the same plane. For example, the computer device may directly update the three-dimensional space data of the bottom faces of the scene object models into three-dimensional space data of the terrain points in the corresponding terrain areas, and thus, the terrain points in the terrain areas and the points on the bottom faces of the scene object models are located in the same plane, thereby obtaining the smoothened terrain areas. The computer device may add the scene object models to the smoothened terrain areas in the three-dimensional terrain model, thereby obtaining the three-dimensional virtual scene corresponding to the real scene.

Figure 7:
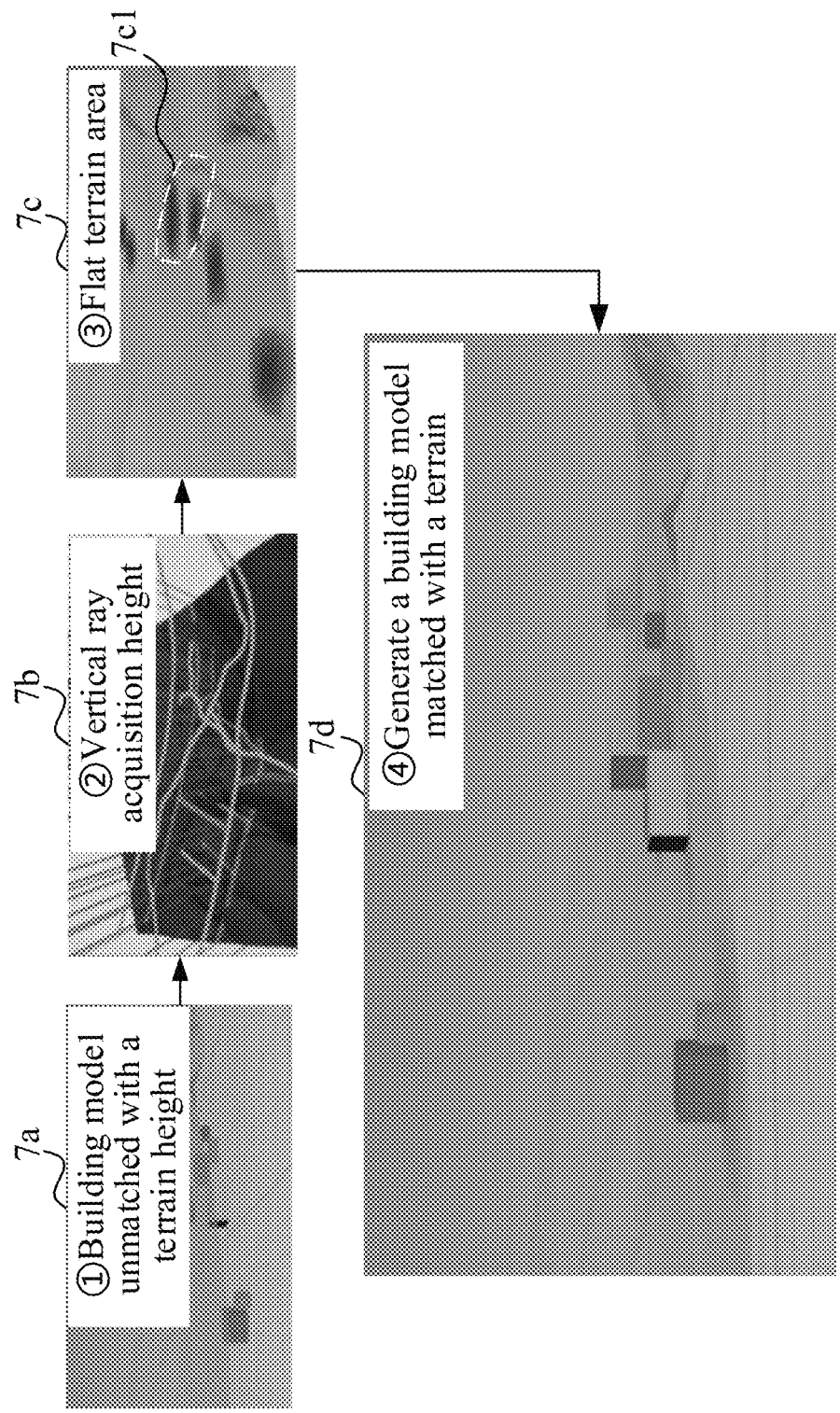
FIG. 7 is a schematic diagram of adding scene object models to a three-dimensional terrain model according to some embodiments.

FIG. 7 is a schematic diagram of adding scene object models to a three-dimensional terrain model in some embodiments. Referring to FIG. 7, taking scene objects being buildings as an example, corresponding scene object models are building models. If the building models are directly generated in a three-dimensional terrain, building models 7a unmatched with a terrain height will be obtained. Thus, a computer device needs to update height coordinates of the building models and height coordinates of corresponding terrain areas. For example, the computer device may acquire height information 7b in a y-axis based vertical ray manner and further performs smoothing treatment on the terrain areas corresponding to the building models in the three-dimensional terrain model so as to flatten corresponding terrain areas 7c. For example, a terrain area corresponding to one building model in the three-dimensional terrain model is a terrain area 7c1.

Specifically, the computer device may cache terrain point cloud data and building point set data corresponding to the terrain. For example, the computer device may acquire building points of a bottom face of each building according to y-axis coordinate information of the building point set data of each building, namely traverses and searches for building points with the minimum y coordinate value, and deletes the remaining building points with y not being the value. For example, the computer device may name the screened-out building points with the minimum y coordinate value as flatbuilding, and newly add a null attribute height to the building points flatbuilding for storing an updated height of the building points flatbuilding.

An expression based on a y-axis ray manner may specifically be as below:

flatbuilding[n].height=flatbuilding[n].y−ground$^{maxY}$(flatbuilding[n].x,flatbuilding[n].z).y, where, flatbuilding[n] represents a screened-out building point on a building bottom face, flatbuilding[n].height represents an updated height of the building point flatbuilding, and ground$^{maxY}$(x, z) represents terrain points with the maximum y value at an x position and a z position in x-axis and z-axis coordinates; and ground$^{maxY}$(flatbuilding[n].x, flatbuilding[n].z).y represents a y-coordinate value of a terrain point with the maximum y value in terrain points the same as the building point flatbuilding[n] in x-axis coordinate and z-axis coordinate.

For each point on the building bottom face, each terrain point in a corresponding terrain area is processed as below:

ground(flatbuilding[n].x,flatbuilding[n].z)
.y=flatbuilding[n].height, where, ground(flatbuilding[n].x, flatbuilding[n].z).y represents an updated y-coordinate value of each terrain point in the terrain area.

For each building point of each building, all the points are processed as below:

Building[n].y=Building[n].y-flatbuilding[n].height, where, Building[n].y represents a y-coordinate value of a building point n of a building model, in other words, y-coordinate values of all the building points in the building model are updated so that a building can be integrally moved to a flattened ground, thus, a smoothened terrain area can be obtained, and a building model 7d matched with a terrain height is generated.

In this embodiment, in a process of adding the scene object models to the three-dimensional terrain model, smoothing treatment is performed on the terrain areas corresponding to the scene object models in the three-dimensional terrain model, accordingly, heights of the bottom faces of the scene object models can be accurately matched with the corresponding terrain areas, and thus, an effect of the generated virtual scene is improved.

In some embodiments, the step of determining terrain areas corresponding to scene object models in a three-dimensional terrain model includes: Determine a position area corresponding to the scene object models in the three-dimensional terrain model and an adjacent area of the position area as the terrain areas corresponding to the scene object models.

The position area corresponding to the scene object models in the three-dimensional terrain model refers to an area corresponding to a terrain located at the same plane with the scene object models in the three-dimensional terrain model. The adjacent area of the position area refers to a peripheral area of the position area, such as a peripheral area away from the position area by a preset range.

Specifically, a computer device determines the position area corresponding to the scene object models in the three-dimensional terrain model and the adjacent area of the position area as the terrain areas corresponding to the scene object models and needing to be subjected to smoothing treatment.

In this embodiment, the position area corresponding to the scene object models in the three-dimensional terrain model and the adjacent area of the position area are determined as the terrain areas corresponding to the scene object models, thereby improving accuracy of the determined terrain areas.

In some embodiments, the step of performing smoothing treatment on terrain areas to obtain smoothened terrain areas includes: Update a height of a position area according to height differences between bottom faces of scene object models and the position area. Perform smoothing treatment on a height of an adjacent area according to an updated height of the position area to obtain the smoothened terrain areas.

After smoothing treatment is performed on the terrain areas in one-to-one correspondence with the scene object models, there may be a drop height between the smoothened terrain areas and the surrounding adjacent area. Thus, a computer device may perform smoothing treatment on the terrain areas corresponding to the scene object models and the surrounding adjacent area.

Specifically, the computer device may update the height of the position area according to the height differences between the bottom faces of the scene object models and the position area. For example, the computer device may update y-coordinate values of the bottom faces of the scene object models into a y-coordinate value corresponding to a terrain point with the maximum y-coordinate value in the position area, then update y-coordinate values of all terrain points in the position area into the updated y-coordinate value of the bottom faces of the scene object models, thereby obtaining the smoothened position area.

The computer device may perform smoothing treatment on the adjacent area of the position area according to the updated y-coordinate value of the position area. For example, the computer device may perform weighing smoothing treatment on the y-coordinate values of terrain points of the adjacent area according to a preset weight so as to perform smoothing transition on the position area and the corresponding adjacent area.

Figure 8:
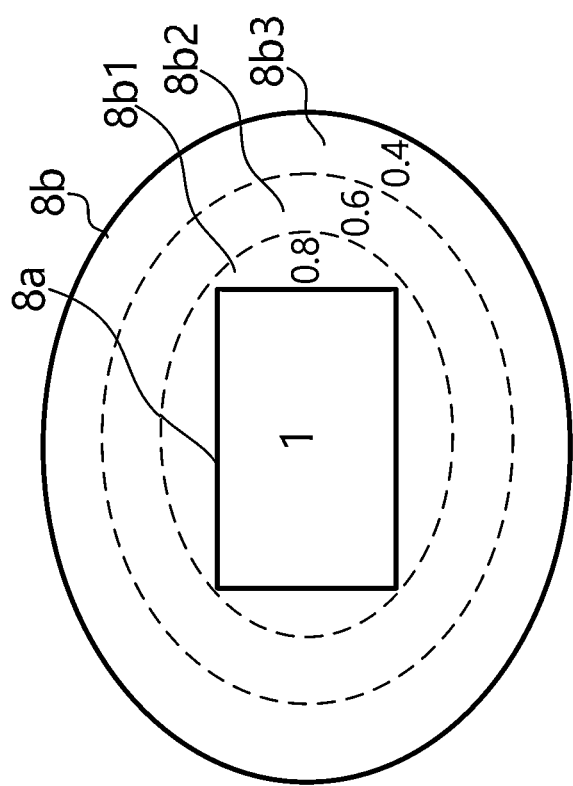
FIG. 8 is a schematic diagram of flattening terrain areas corresponding to scene object models according to some embodiments.

FIG. 8 is a schematic diagram of flattening terrain areas corresponding to scene object models in some embodiments. A rectangular area is a position area 8a corresponding to the scene object models in a three-dimensional terrain model, an oval area except the position area 8a is an adjacent area 8b corresponding to the position area 8a. The adjacent area 8b may be divided into a plurality of subareas including a subarea 8b1, a subarea 8b2 and a subarea 8b3 according to preset proportions, and a corresponding smoothing weight is allocated to each subarea. Taking the smoothing weight of the position area 8a being 1 as an example, a smoothing weight corresponding to the subarea 8b1 may be 0.8, a smoothing weight corresponding to the subarea 8b2 may be 0.6, and a smoothing weight corresponding to the subarea 8b3 may be 0.4. After smoothing treatment is performed on the position area 8a, weighing smoothing treatment is respectively performed on the plurality of subareas in the adjacent area 8b according to the allocated smoothing weights. For example, the position area 8a has a height obtained after one-hundred-percent smoothing and a smoothing weight is 0.8, which indicates the sum of final-height smoothened height*0.8 of a corresponding terrain point and an original terrain point height*0.2. An effect of transition smoothing can be effectively realized by performing weighing smoothing treatment on the adjacent area and weighing fusion on the height of the adjacent area after smoothing and an original terrain.

In this embodiment, the height of the position area is updated according to the height differences between the bottom faces of the scene object models and the position area, the height of the adjacent area is subjected to smoothing treatment according to an updated height of the position area, and then, the smoothened terrain areas are obtained, thereby improving smoothing treatment accuracy.

In some embodiments, a virtual scene generation method further includes the following steps: Perform alignment processing on a scene area corresponding to scene distribution data and a scene area corresponding to three-dimensional space data to obtain a scene aligned area. Select scene distribution data matched with the scene aligned area from the scene distribution data to obtain aligned scene distribution data. The step of acquiring the three-dimensional space data and the scene distribution data corresponding to a real scene includes: Acquire the three-dimensional space data and the aligned scene distribution data corresponding to the real scene.

The three-dimensional space data and the scene distribution data are acquired according to the scene area corresponding to the same real scene. For example, three-dimensional space data and scene distribution data within a scene area range corresponding to longitude and latitude information may be acquired according to a scene area corresponding to the same longitude and latitude information in the real scene.

The situation of range inconsistency or low consistency may exist for the three-dimensional space data and the scene distribution data within the same scene area range. Thus, a computer device may further perform alignment preprocessing on the acquired three-dimensional space data and the acquired scene distribution data.

Specifically, after acquiring the three-dimensional space data and the scene distribution data corresponding to the real scene, the computer device may perform alignment processing on the scene area corresponding to the scene distribution data and the scene area corresponding to the three-dimensional space data to obtain the scene aligned area. When the acquired scene distribution data is possibly incompletely consistent to the scene area of the three-dimensional space data, the computer device may perform alignment on the scene area corresponding to the scene distribution data and the scene area corresponding to the three-dimensional space data, or perform alignment on the scene area corresponding to the three-dimensional space data and the scene area corresponding to the scene distribution data.

In some embodiments, a computer device may select scene distribution data matched with a scene aligned area from scene distribution data to obtain aligned scene distribution data. In other words, the scene distribution data in a scene area is extracted from the scene distribution data based on the scene area corresponding to the three-dimensional space data, or the three-dimensional space data in a scene area is extracted from the three-dimensional space data based on the scene area of the scene distribution data, and thus the scene area corresponding to the scene distribution data is completely aligned with the scene area corresponding to the three-dimensional space data.

In some embodiments, a computer device may acquire three-dimensional space data and aligned scene distribution data corresponding to a real scene, and generate a virtual scene based on the three-dimensional space data and the aligned scene distribution data.

In this embodiment, an effect of the generated virtual scene is improved by acquiring the three-dimensional space data corresponding to the real scene and the aligned scene distribution data and generating the virtual scene based on the three-dimensional space data and the aligned scene distribution data.

In some embodiments, scene distribution data includes point set data corresponding to scene objects. The step of selecting scene distribution data matched with a scene aligned area from the scene distribution data includes: Select complete point set data from the scene distribution data if the scene aligned area has complete point set data of a first object type of scene objects. Select point set data of a second object type of scene objects in the scene aligned area from the scene distribution data.

The point set data corresponding to the scene objects refers to that each scene object is composed of at least one point. Each point includes corresponding distribution information such as coordinate information, and attribute information including a belonging structure, an object type, etc. Point set data corresponding to each scene object may be regarded as corresponding node structured data.

The first object type of scene objects and the second object type of the scene objects may refer to scene objects different in type attribute. The first object type may refer to scene objects which are small in structure or occupy small areas, such as buildings, vehicles, stone and other objects.

The second object type may refer to scene objects which are large in structure or occupy large areas, such as roads, rivers, lakes, parks and other objects.

In some embodiments, a computer device may perform alignment processing on a scene area corresponding to scene distribution data and a scene area corresponding to three-dimensional space data to obtain a scene aligned area after alignment. The computer device may select the scene distribution data matched with the scene aligned area from the scene distribution data. The matched scene distribution data may refer to scene distribution data completely in the scene aligned area.

In some embodiments, a computer device may select scene distribution data matched with a scene aligned area from scene distribution data, and when the scene aligned area has complete point set data of a first object type of scene objects, only the complete point set data is selected. When the scene aligned area has incomplete point set data of the scene objects, complete point set data corresponding to the scene objects are eliminated from the scene distribution data. In other words, the complete point set data of the scene objects in the scene aligned area is only selected from the scene distribution data. Accordingly, the incomplete first object type of scene objects can be effectively prevented.

A second object type of scene objects are usually large in structure or large in occupied area, and thus, the computer device may directly select point set data of the scene objects in the scene aligned area from the scene distribution data. In other words, if the second object type of scene objects are distributed inside and outside the scene aligned area, only part of point set data of the scene objects inside the scene aligned area is extracted.

In some embodiments, scene distribution data may be acquired from a preset database, and when outputted, the scene distribution data may not be outputted completely according to a determined area, which possibly causes a data center point being uncontrollable. Thus, the situation of misalignment may occur to the acquired scene distribution data and the acquired three-dimensional space data. Specifically, the computer device may adopt a preset script to automatically perform alignment processing on the scene distribution data and the three-dimensional space data. The script refers to an executable file compiled by a specific descriptive language according to a certain format. The script preset in this embodiment is used for automatically performing alignment processing on the scene distribution data and the three-dimensional space data and processing surplus data so that the scene distribution data can be automatically aligned with the three-dimensional space data without manual intervention, thereby improving alignment processing efficiency of the scene distribution data and the three-dimensional space data.

Figure 9:
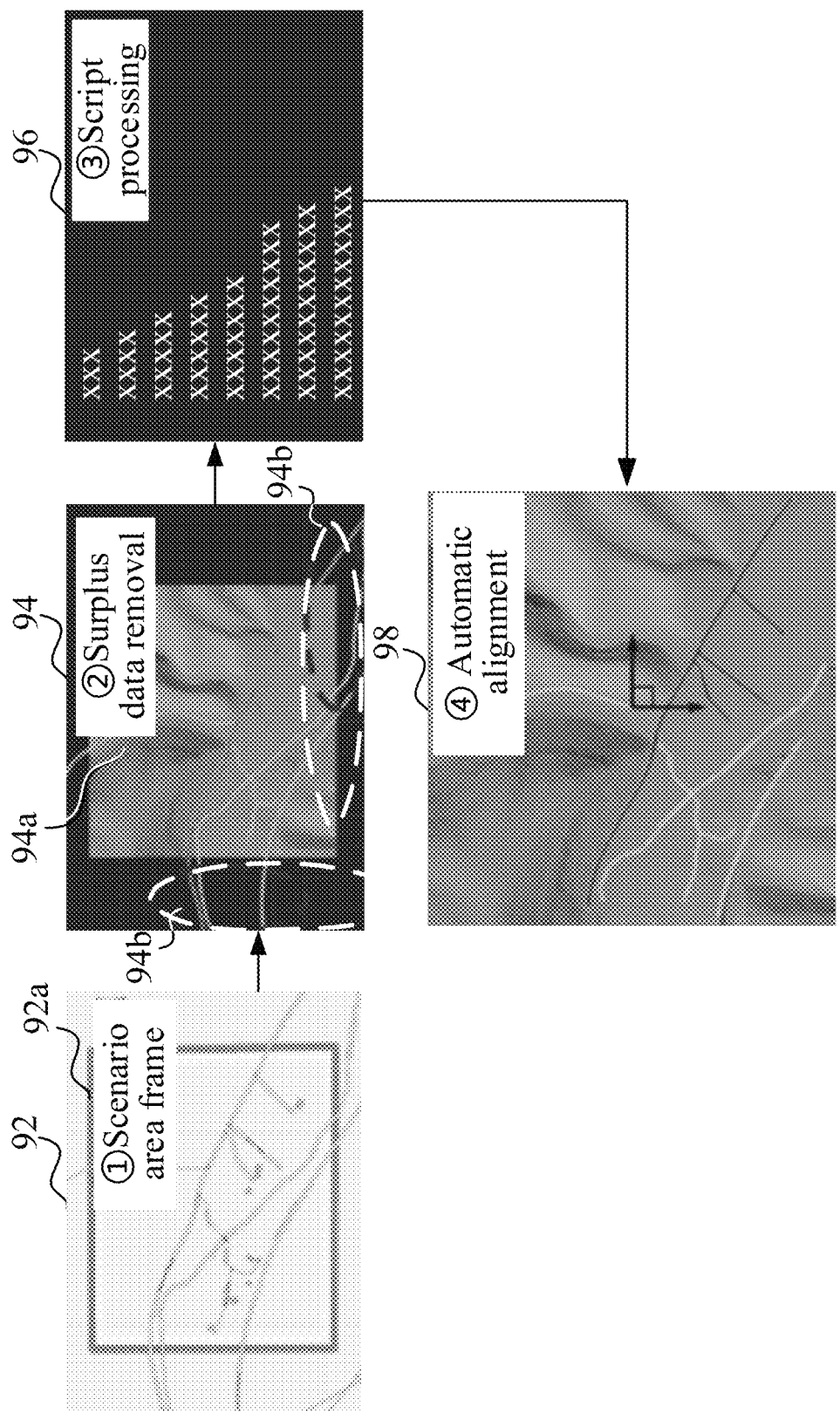
FIG. 9 is a schematic diagram of aligning scene distribution data with three-dimensional space data according to some embodiments.

FIG. 9 is a schematic diagram of aligning scene distribution data with three-dimensional space data in some embodiments. A computer device may arrange a schematic diagram 92 corresponding to original scene distribution data and a scene area frame 92a corresponding to the three-dimensional space data in the same plane to perform area alignment, and specifically, an area where the schematic diagram 92 corresponding to the scene distribution data coincides with the scene area frame 92a is determined as a scene aligned area, namely an area corresponding to the scene area frame 92a in FIG. 9. Then, for the scene distribution data and three-dimensional space data 94 after alignment, surplus data 94b outside the scene aligned area 94a is removed. Specifically, the preset script 96 may be adopted to perform removal processing and automatic alignment on the surplus data 94*b* so as to obtain scene distribution data and three-dimensional space data 98 after automatic alignment.

The scene distribution data includes point set data corresponding to scene objects, namely structured data of the scene objects, and the point set data is a combination composed of one or more points. When the surplus data 94*b* outside the scene aligned area 94*a* is removed, it may be determined that part of point set data in the deleted point set data of the scene objects are complete according to the object type of the scene objects.

In some embodiments, a computer device may traverse point set data of each scene object in scene distribution data according to position information, such as longitude and latitude information of a scene aligned area 94*a*, screen out points outside the scene aligned area 94*a*, delete the points and store structure indexes to which the points belong in corresponding mark arrays. Then, structured data corresponding to the structure indexes in the mark arrays is processed according to the object type of the scene objects. If the object type of the scene objects is a first object type, such as buildings and other complete structures, corresponding structured data is completely deleted. If the object type of the scene objects is a second object type, such as roads and other structures, only road points outside the scene aligned area 94*a* are deleted. Accordingly, the situation of half buildings or other strange structures can be prevented.

In this embodiment, the complete point set data is selected from the scene distribution data if the scene aligned area has the complete point set data of the first object type of the scene objects, and the point set data of the second object type of the scene objects in the scene aligned area is selected from the scene distribution data, thereby determining a manner of obtaining the point set data based on the object type and improving flexibility of obtaining the point set data.

In some embodiments, the above virtual scene generation method further includes the following step: Remove complete point set data corresponding to scene objects from scene distribution data if a scene aligned area has incomplete point set data of the scene objects.

Specifically, when the scene aligned area has the incomplete point set data of the scene objects, a computer device may eliminate the complete point set data corresponding to the scene objects from the scene distribution data. In other words, the complete point set data of the scene objects in the scene aligned area is only selected from the scene distribution data. Accordingly, the incomplete first object type of scene objects can be effectively prevented.

In this embodiment, when the scene aligned area has the incomplete point set data of the scene objects, the complete point set data corresponding to the scene objects is eliminated from the scene distribution data, thereby reducing the situation of the incomplete first object type of scene objects.

In some embodiments, a computer device may adopt a preset editor plugin and utilize three-dimensional space data and scene distribution data corresponding to a real scene to automatically generate a virtual scene similar to the real scene. The preset editor plugin may be an editor plugin based on a visual editing engine, such as an editor plugin based on Unreal Engine (UE) 4. The editor plugin includes a plurality of tool plugins, such as at least one of a building creating tool, a scene creating tool, a ground flattening tool, a terrain creating tool, etc.

Figure 10:
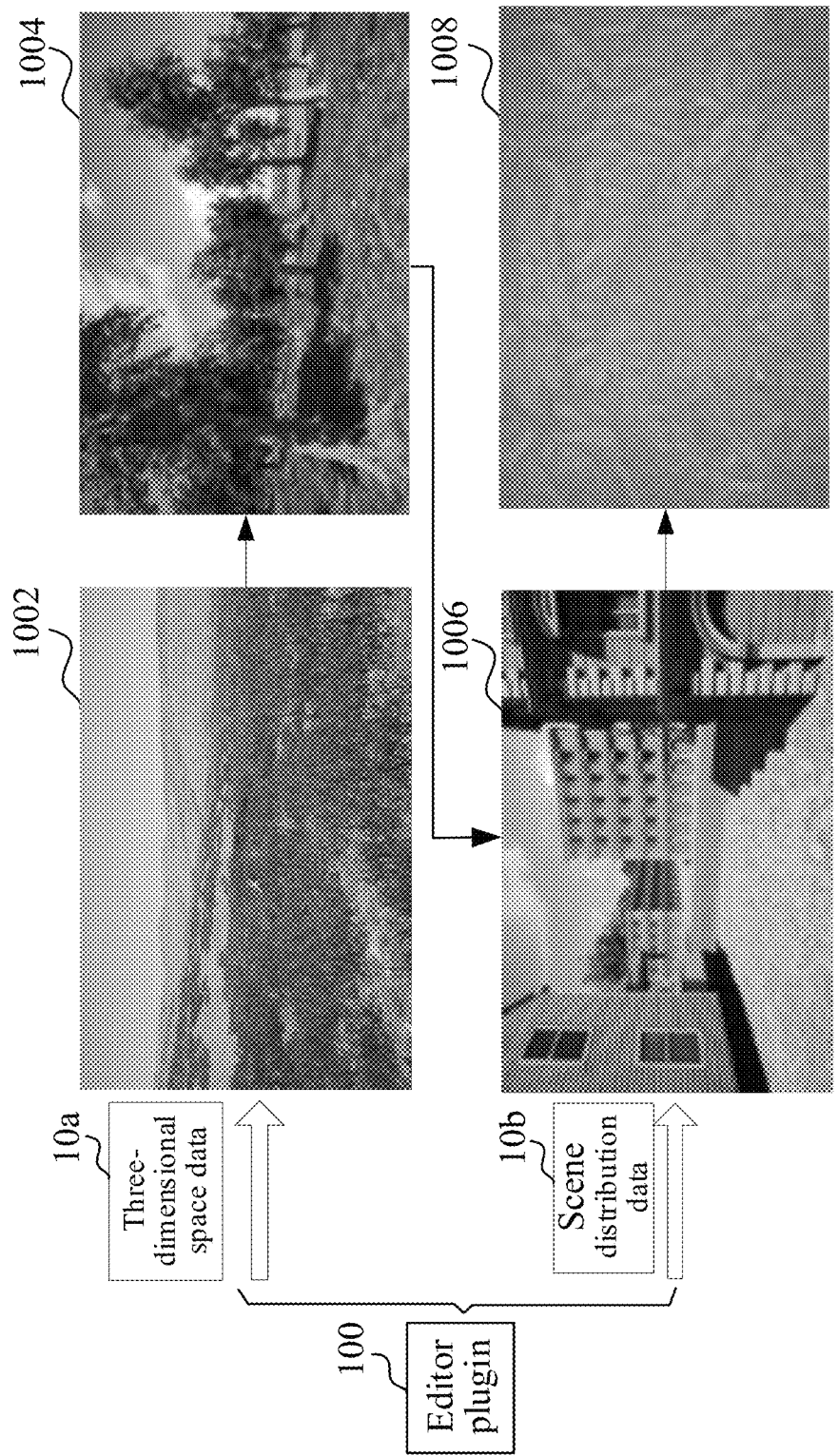
FIG. 10 is a whole process schematic diagram of generating a virtual scene according to some embodiments.

FIG. 10 is a whole process schematic diagram of generating a virtual scene in some embodiments. After acquiring three-dimensional space data and scene distribution data corresponding to a real scene, a computer device firstly generates a terrain model 1002 and a vegetation model 1004 in the terrain model according to three-dimensional space data 10*a* based on an editor plugin 100, then, generates a building model 1006 and a road model 1008 in the terrain model 1002 according to the scene distribution data 10*b*, thereby obtaining the virtual scene corresponding to the real scene.

Figure 11:
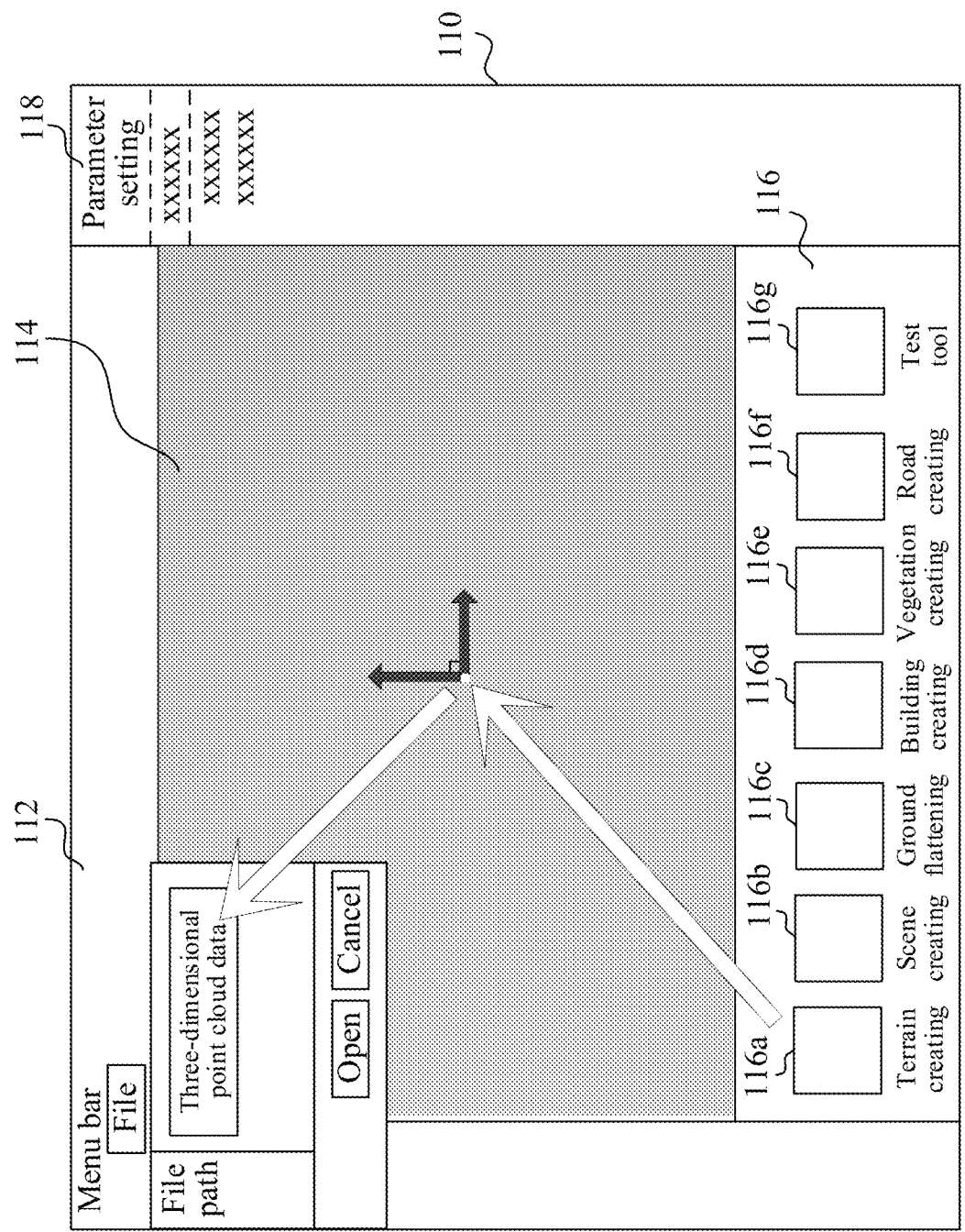
FIG. 11 is a schematic diagram of an interface of a preset editor plugin according to some embodiments.

Specifically, FIG. 11 is a schematic diagram of an interface of a preset editor plugin in some embodiments. Taking a computer device being a terminal as an example, an editor plugin is deployed in the terminal, an interface 110 of the editor plugin is displayed at the terminal, and the interface 110 of the editor plugin includes a menu area 112, a scene preview area 114, a creating tool area 116, a parameter set area 118, etc. The creating tool area 116 includes a terrain creating tool 116*a*, a scene creating tool 116*b*, a ground flattening tool 116*c*, a building creating tool 116*d*, a vegetation creating tool 116*e*, a road creating tool 116*f* and a test tool 116*g*. The menu area 112 includes a plurality of menu function widgets in the editor plugin, such as file selection and editing set parameter setting. The test tool 116*g* may be configured to test a generated local model or a final virtual scene.

Figure 12:
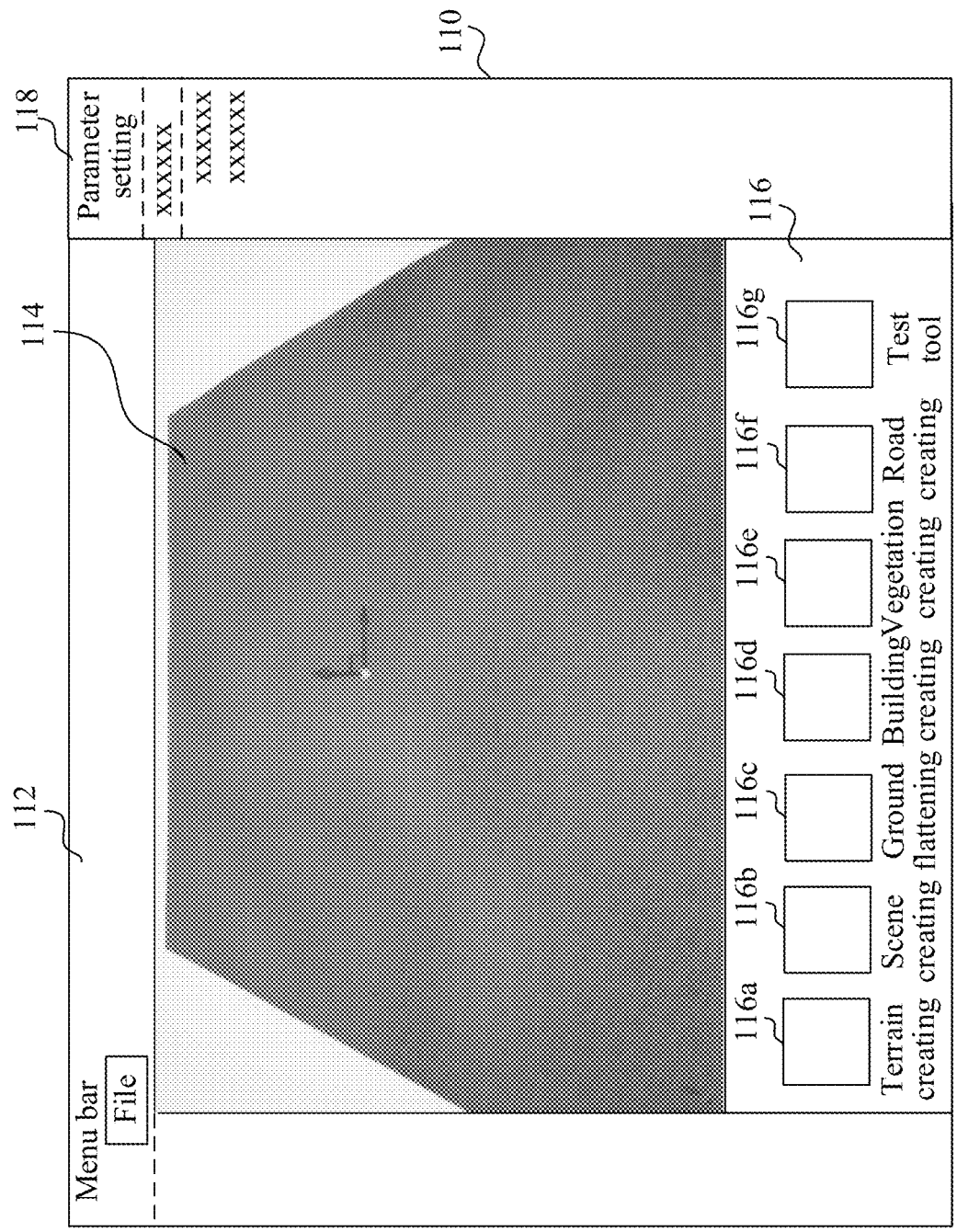
FIG. 12 is a schematic diagram of showing a terrain model generated automatically based on three-dimensional point cloud data according to some embodiments.

A user may acquire three-dimensional space data and scene distribution data corresponding to a real scene through the terminal. Specifically, taking the three-dimensional space data being three-dimensional point cloud data and the scene distribution data being OSM data as an example, the user may add the acquired three-dimensional point cloud data and the acquired OSM data to the corresponding tool plugins, and then the corresponding virtual scene is automatically generated in the editor plugin. For example, the user may firstly utilize the terminal for inputting the three-dimensional point cloud data 1122 to the terrain creating tool 116*a*. Then, a corresponding initial terrain model is automatically generated on the basis of preset parameters. The generated initial terrain model includes various terrain types of terrain areas, and each terrain area includes terrain surface attribute information corresponding to a belonging terrain type. For example, texture information corresponding to a belonging terrain type is added. FIG. 12 is a schematic diagram of showing an initial terrain model generated automatically based on three-dimensional point cloud data in a scene preview area 114 of an interface 110 of an editor plugin.

Figure 13:
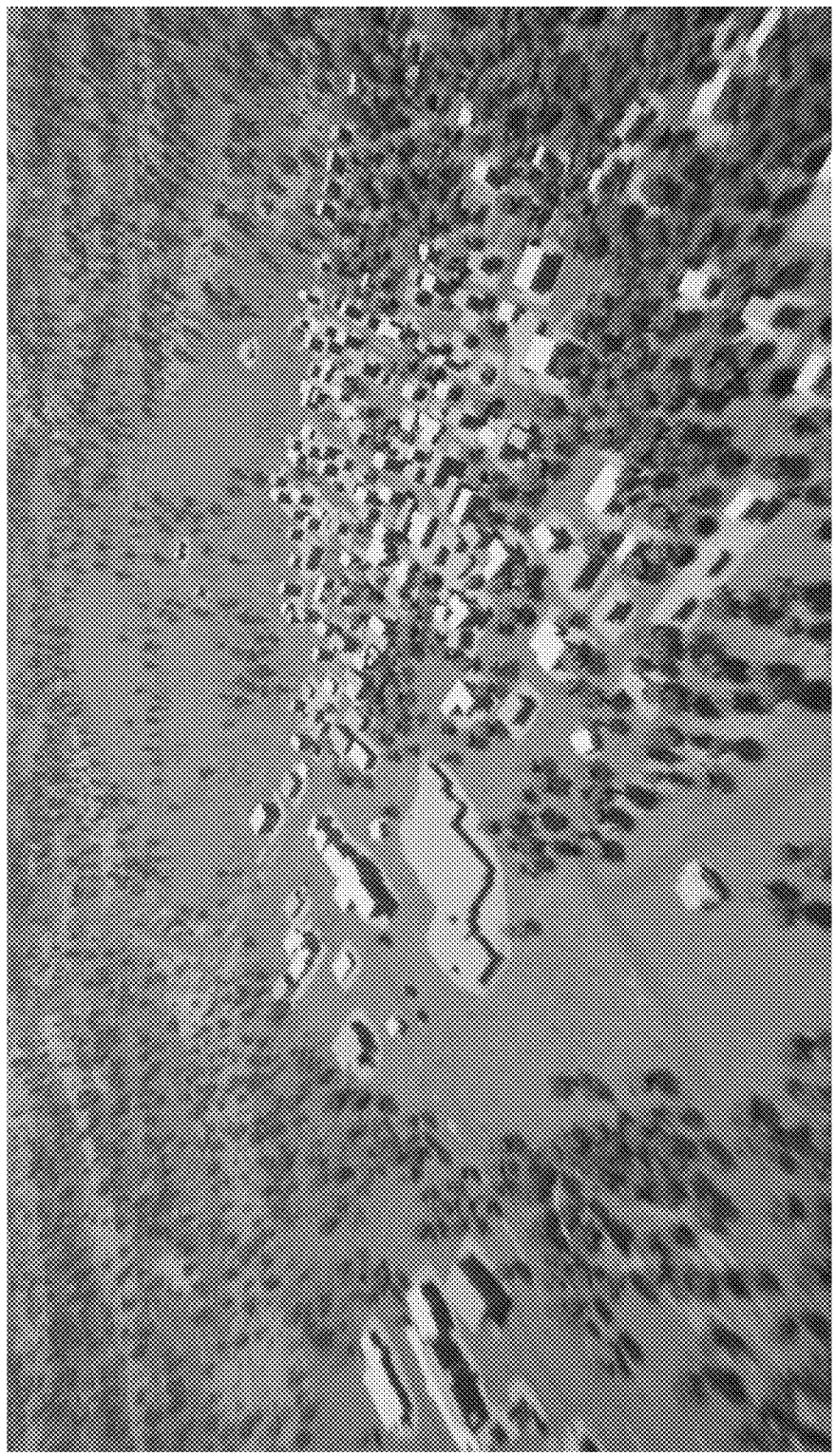
FIG. 13 is a schematic diagram of a final virtual scene obtained according to some embodiments.

Then, the terminal may further generate terrain surface cover objects such as a tree model in the initial terrain model through the vegetation creating tool 116*e*, thereby obtaining a three-dimensional terrain model. Meanwhile, the scene distribution data may be inputted into the scene creating tool 116*b*, and the scene creating tool 116*b* may perform alignment processing and other preprocessing on the scene distribution data. Then, the terminal may generate, by the building creating tool 116*d* and the road creating tool 116*f*, a building model, a road model and other scene object models in the three-dimensional terrain model based on the scene distribution data, may further perform smoothing treatment, by the ground flattening tool 116*c*, on terrain areas corresponding to the building model and the road model, and then add the building model and the road model to the correspondingly smoothened terrain areas in the three-dimensional terrain model, thereby obtaining the final virtual scene. FIG. 13 is a schematic diagram of a final virtual scene obtained in some embodiments.

In some embodiments, after a terminal utilizes a preset editor plugin for generating a final virtual scene, a common visual editing engine such as a UE4 editing engine can be adopted for editing the generated virtual scene again. The Unreal Engine includes a Landscape system (a terrain system), a Spline system (a road system), a Foliage system (a vegetation system), etc. Specifically, the preset editor plugin may be a three-dimensional scene editing program generated based on the common visual editing engine, where an interface corresponding to the visual editing engine may be configured in the preset editor plugin so that the preset editor plugin can be in butt joint with an editing system of the common visual editing engine, and accordingly, production pipeline butt joint and secondary editing can be performed on the generated virtual scene through the common visual editing engine.

Figure 14:
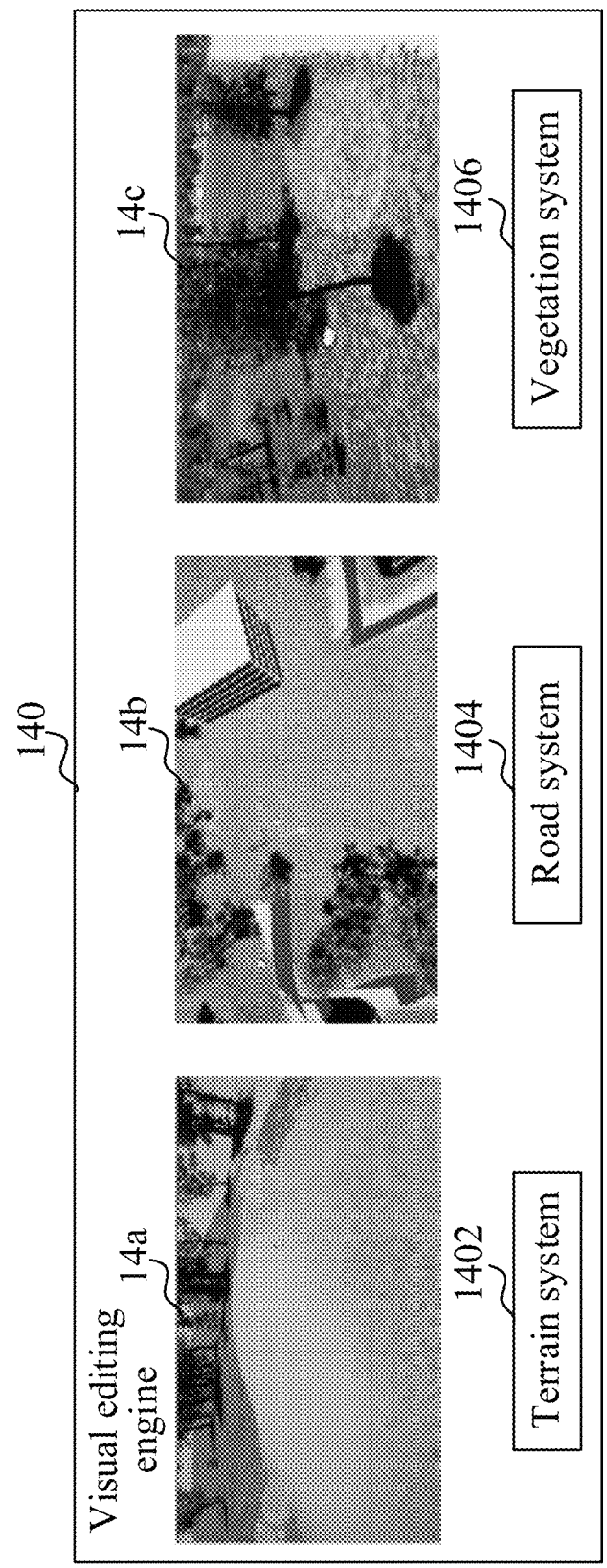
FIG. 14 is a schematic diagram of re-editing a virtual scene through a visual editing engine according to some embodiments.

FIG. 14 is a schematic diagram of re-editing a virtual scene through a visual editing engine in some embodiments. After a terminal generates a virtual scene corresponding to a real scene through a preset editor plugin, the terminal may adopt a visual editing engine 140, such as a terrain system 1402 of an Unreal Engine to edit a terrain model 14a in the virtual scene, adopt a road system 1404 in the Unreal Engine to edit a terrain model 14b in the virtual scene, and adopt a vegetation system 1406 in the Unreal Engine to edit a terrain model 14c in the virtual scene, thereby efficiently performing secondary editing on the virtual scene.

Figure 15:
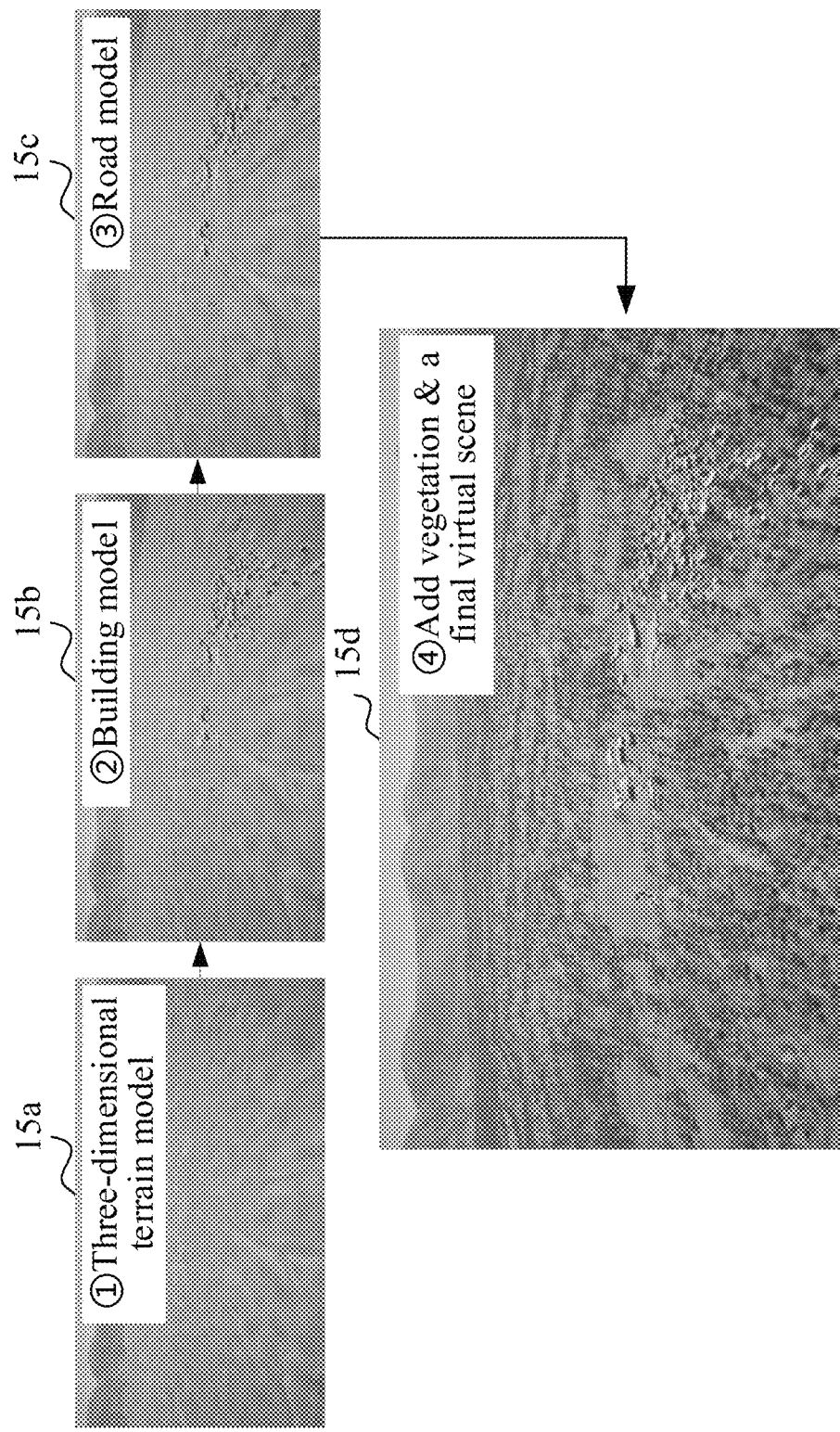
FIG. 15 is an effect schematic diagram of step-by-step generating of a virtual scene according to some embodiments.

In a test embodiment, a computer device acquires three-dimensional space data and scene distribution data corresponding to a real scene with a scene area size being 8 km*8 km, and it takes 20 min to generate a virtual scene corresponding to a real scene through the above virtual scene generation method. FIG. 15 is an effect schematic diagram of step-by-step generating of a virtual scene in some embodiments. A computer device may firstly generate a three-dimensional terrain model 15a according to three-dimensional space data, and then generate a building model 15b and a road model 15c in the three-dimensional terrain model 15a according to scene distribution data. Then, the computer device generates a vegetation model in the three-dimensional terrain model 15a, thereby obtaining a final virtual scene 15d. Data corresponding to a real scene is converted into position information and then transmitted to a preset editor plugin. A three-dimensional scene model is generated by the preset editor plugin, a texture and other attribute information are automatically attached, thus, the virtual scene is rapidly and automatically generated, programming generation efficiency of the virtual scene is high, and rapid iteration is facilitated. Compared with a conventional manner of programming generation of a virtual scene, time consumed by the virtual scene generation method in this embodiment can be shortened to a half, which greatly improves the efficiency of automatic generation of the virtual scene.

Figure 16:
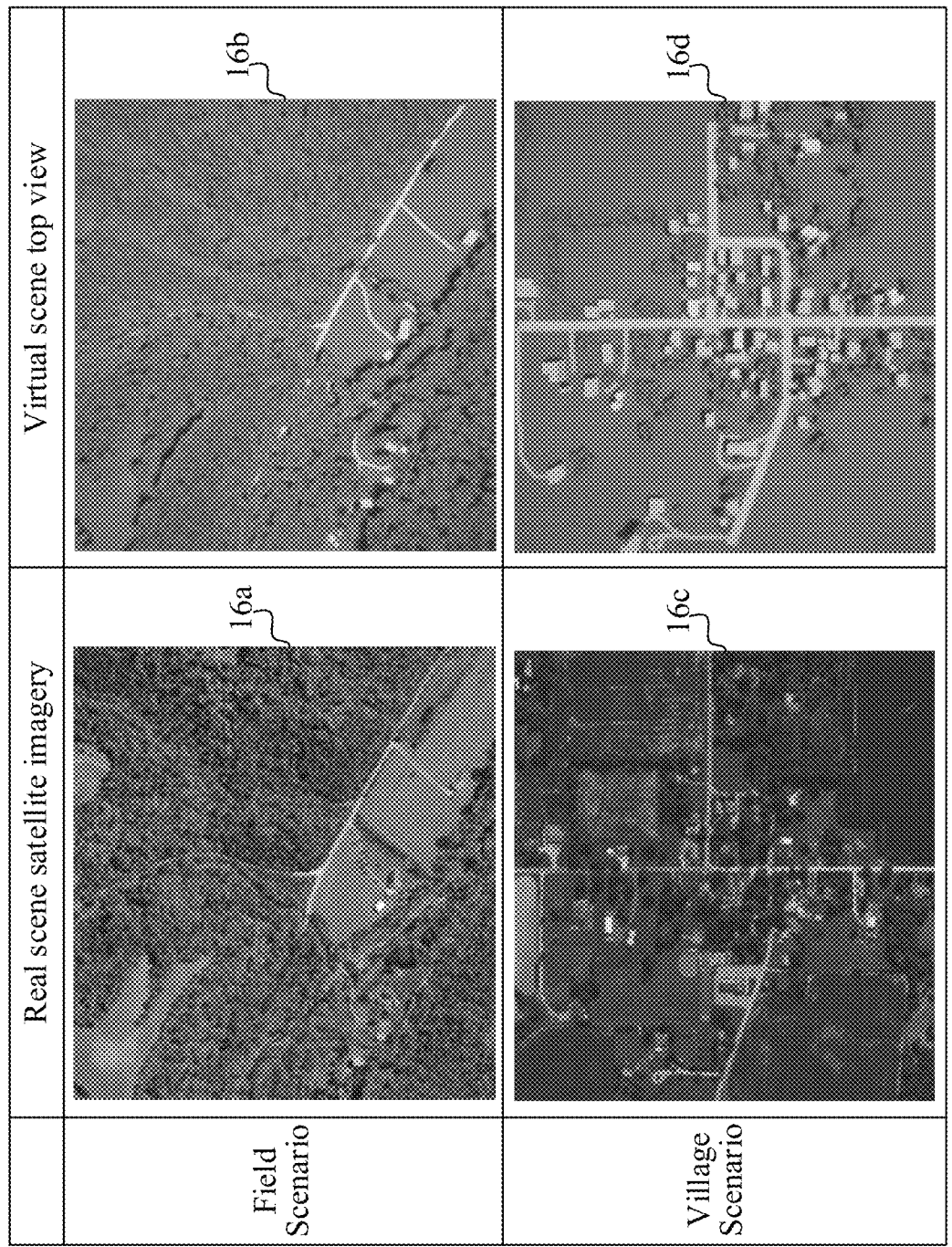
FIG. 16 is an effect schematic diagram of a real scene and a virtual scene according to some embodiments.

FIG. 16 is an effect schematic diagram of a real scene and a virtual scene. A schematic diagram of the real scene may be indicated by a satellite imagery or a photography or the like. Referring to FIG. 16, the real scene may include a field scene area, a village scene area and other scene areas. The real scene may be indicated by a real scene satellite imagery. A top view 16b of a virtual scene corresponding to a real field scene area 16a may be generated by acquiring three-dimensional space data and scene distribution data corresponding to the real field scene area 16a. A top view 16d of a virtual scene corresponding to a real village scene area 16c may be generated by acquiring three-dimensional space data and scene distribution data corresponding to the real village scene area 16c. It can be seen from an effect comparison diagram in FIG. 16, the generated virtual scenes and the real scenes are high in similarity, a degree of restoring the real scenes is high, and a scene distribution situation in the real scenes is accurately restored.

This application further provides an application scene which is a three-dimensional game scene, specifically applied to an open world type three-dimensional game scene. The three-dimensional game scene applies the above virtual scene generation method. Specifically, the open world type three-dimensional game scene includes an open world terrain, where the open world terrain is an open world type task space and commonly includes an ultra-wide-range map corresponding to the open world terrain. In a conventional three-dimensional game scene, a mega terrain in the three-dimensional game scene is commonly generated in combination with a programming tool according to manually-assigned information such as a range and a height on the basis of randomness. But the terrain generated according to the manner may not conform to a realistic logic.

In this embodiment, a computer device may deploy a preset editor plugin in a game development system, namely an editor program for producing a game scene. Specifically, the computer device firstly acquires three-dimensional space data and scene distribution data corresponding to a real scene, then extracts terrain features from the three-dimensional space data through the preset editor plugin, then generates a three-dimensional terrain model according to the terrain features, extracts scene object features of scene objects in the real scene from the scene distribution data, then, generates scene object models corresponding to the scene object features in the three-dimensional terrain model, and obtains a three-dimensional virtual game scene corresponding to the real scene. Accordingly, the three-dimensional game scene which is similar to the real scene and conforms to the realistic logic can be efficiently and accurately generated.

This application further provides an application scene. The application scene is a three-dimensional environment simulation scene such as a traffic road simulation scene, a tourist environment simulation scene and a building simulation scene, which applies the above virtual scene generation method. A virtual scene similar to a real scene may be automatically generated for three-dimensional environment demonstration scenes in various environments.

Specifically, a computer device firstly acquires three-dimensional space data and scene distribution data corresponding to the real scene within a preset area range, then extracts terrain features from the three-dimensional space data, then generates a three-dimensional terrain model according to the terrain features, extracts scene object features of scene objects in the real scene from the scene distribution data, then, generates scene object models corresponding to the scene object features in the three-dimensional terrain model, and obtains a three-dimensional virtual demonstration scene corresponding to the real scene. Accordingly, the three-dimensional environment simulation scene which is similar to the real scenes and conforms to the realistic logic can be efficiently and accurately generated.

A traffic road simulation scene conforming to a traffic road distribution situation in a real scene can be automatically generated according to three-dimensional space data and scene distribution data corresponding to a traffic road in the real scene. The generated traffic road simulation scene may be used for assisting an intelligent transportation system. For example, a vehicle-mounted terminal displays the generated traffic road simulation scene for assisting in recognizing a current road environment so as to improve traffic efficiency.

The tourist environment simulation scene similar to a tourist environment in the real scene and the building simulation scene corresponding to buildings in the real scene can be automatically generated according to three-dimensional space data and scene distribution data corresponding to the tourist environment or the buildings in the real scene, thus, a virtual scene similar to scene elements in the real scene can be efficiently and automatically generated, and accordingly, the scene environment, scene objects and other scene elements in the real scene can be accurately restored through simulation.

It is to be understood that, steps in flowcharts of the foregoing embodiments are displayed in sequence based on indication of arrows, but the steps are not necessarily performed in sequence based on a sequence indicated by the arrows. Unless otherwise explicitly specified in this specification, execution of the steps is not strictly limited, and the steps may be performed in other sequences. In addition, at least some steps in the foregoing embodiments may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 17:
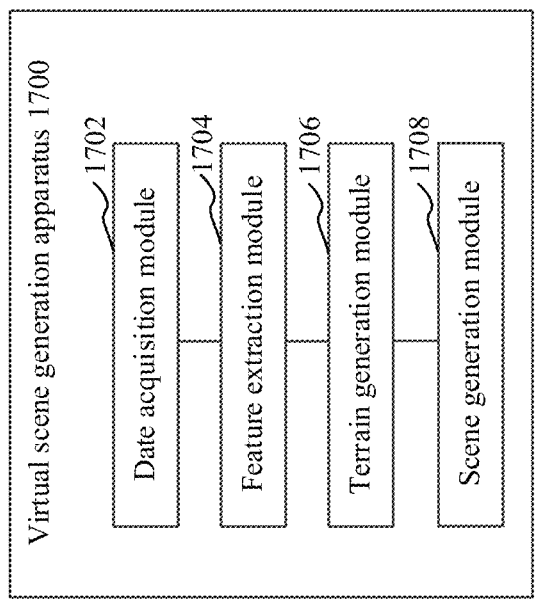
FIG. 17 is a structural block diagram of a virtual scene generation apparatus according to some embodiments.

In an embodiment, as shown in FIG. 17, a virtual scene generation apparatus 1700 is provided. The apparatus may use software modules or hardware modules, or become a part of a computer device by a combination of the two. The apparatus specifically includes: a data acquisition module 1702, a feature extraction module 1704, a terrain generation module 1706, and a scene generation module 1708.

The data acquisition module 1702 is configured to acquire three-dimensional space data and scene distribution data corresponding to a real scene.

The feature extraction module 1704 is configured to extract terrain features from the three-dimensional space data.

The terrain generation module 1706 is configured to generate a three-dimensional terrain model according to the terrain features.

The feature extraction module 1704 is further configured to extract scene object features of scene objects in the real scene from the scene distribution data.

The scene generation module 1708 is configured to generate scene object models corresponding to the scene object features in the three-dimensional terrain model and obtain a virtual scene corresponding to the real scene.

In some embodiments, three-dimensional space data includes terrain space data, and the feature extraction module 1704 is further configured to determine terrain features according to a height difference between adjacent terrain points in the terrain space data.

In some embodiments, a terrain generation module 1706 is further configured to determine terrain types corresponding to terrain areas in terrain space data according to terrain features; add corresponding terrain surface attribute information to the terrain areas according to the terrain types; and generate a three-dimensional terrain model according to the terrain space data with the terrain surface attribute information added.

In some embodiments, three-dimensional space data includes cover object space data. A virtual scene generation apparatus 1700 further includes a terrain surface coverage area determining module configured to determine a terrain surface coverage area in a three-dimensional terrain model according to the cover object space data; and a terrain surface cover object generation module configured to generate terrain surface cover objects in the terrain surface coverage area.

In some embodiments, a terrain surface coverage area determining module is further configured to determine terrain points, in cover object space data, corresponding to terrain surface cover points in a three-dimensional terrain model; select target terrain surface cover points according to height differences between the terrain surface cover points and corresponding terrain points; determine overlapping areas of expansion areas and the three-dimensional terrain model, where the expansion areas are areas obtained after expansion based on the target terrain surface cover points; and determine a terrain surface coverage area in the three-dimensional terrain model according to the overlapping areas.

In some embodiments, a terrain surface cover object generation module is further configured to determine generation parameter information of terrain surface cover objects in a terrain surface coverage area; and generate the terrain surface cover objects in the terrain surface coverage area according to the generation parameter information.

In some embodiments, a feature extraction module 1704 is further configured to determine positions and heights of scene objects in a real scene in a three-dimensional terrain model based on scene distribution data; generate three-dimensional scene object data corresponding to the scene objects according to the positions and the heights; and extract scene object features of the scene objects from the three-dimensional scene object data.

In some embodiments, a feature extraction module 1704 is further configured to determine positions and heights of scene objects in a three-dimensional terrain model according to original positions if scene distribution data includes the original positions of the scene objects in a real scene.

In some embodiments, a feature extraction module 1704 is further configured to determine positions and heights of scene objects in a three-dimensional terrain model according to original positions and original heights if scene distribution data includes the original positions and the original heights of the scene objects.

In some embodiments, a scene generation module 1708 is further configured to generate initial scene object models corresponding to scene objects according to scene object features; add scene object attribute information conforming to object types to the initial scene object models according to the object types of the scene objects to obtain scene object models matched with the scene objects; and add the scene object models to a three-dimensional terrain model to obtain a virtual scene corresponding to a real scene.

In some embodiments, a scene generation module 1708 is further configured to determine corresponding terrain areas of scene object models in a three-dimensional terrain model; perform smoothing treatment on the terrain areas to obtain smoothened terrain areas; and add the scene object models to the smoothened terrain areas in the three-dimensional terrain model to obtain a virtual scene corresponding to a real scene.

In some embodiments, a scene generation module 1708 is further configured to determine a position area corresponding to scene object models in a three-dimensional terrain model and an adjacent area of the position area as terrain areas corresponding to the scene object models.

In some embodiments, a scene generation module 1708 is further configured to update a height of a position area according to height differences between bottom faces of scene object models and the position area; and perform smoothing treatment on a height of an adjacent area according to an updated height of the position area to obtain smoothened terrain areas.

In some embodiments, a virtual scene generation apparatus 1700 further includes an alignment processing module configured to perform alignment processing on a scene area corresponding to scene distribution data and a scene area corresponding to three-dimensional space data to obtain a scene aligned area, and select scene distribution data matched with the scene aligned area from the scene distribution data to obtain aligned scene distribution data; and a data acquisition module 1702 further configured to acquire three-dimensional space data and the aligned scene distribution data corresponding to a real scene.

In some embodiments, scene distribution data includes point set data corresponding to scene objects. An alignment processing module is further configured to select complete point set data from the scene distribution data if a scene aligned area has complete point set data of a first object type of scene objects; and select point set data of a second object type of scene objects in the scene aligned area from the scene distribution data.

In some embodiments, an alignment processing module is further configured to eliminate complete point set data corresponding to scene objects from scene distribution data if a scene aligned area has incomplete point set data of the scene objects.

For a specific limitation on the sample generation apparatus, refer to the limitation on the sample generation method above. Details are not described herein again. The modules in the foregoing apparatus may be implemented entirely or partially by software, hardware, or a combination thereof. The modules may be built in or independent of a processor of a computer device in a hardware form, or may be stored in a memory of the computer device in a software form, so that the processor invokes and performs operations corresponding to the modules.

In some embodiments, a computer device is provided. The computer device may be a server, and an internal structure diagram thereof may be shown in FIG. 18. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The network interface of the computer device is configured to communicate with an external terminal through a network connection. The computer-readable instruction is executed by the processor to implement the image processing method.

In some embodiments, a computer device is provided. The computer device may be a terminal, and an internal structure diagram thereof may be shown in FIG. 19. The computer device includes a processor, a memory, a communication interface, a display screen, and an input apparatus that are connected by using a system bus. The processor of the computer device is configured to provide computing and control capabilities. The memory of the computer device includes a non-volatile (e.g., non-transitory) storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless mode. The wireless mode may be implemented through WIFI, operator network, NFC (near field communication) or other technologies. The computer-readable instruction is executed by the processor to implement the image processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 18:
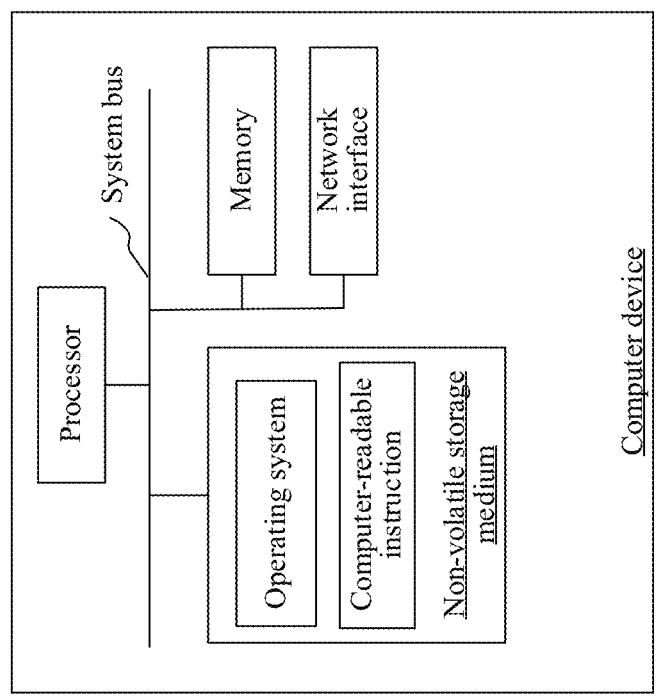
FIG. 18 is a diagram of an internal structure of a computer device according to some embodiments.
Figure 19:
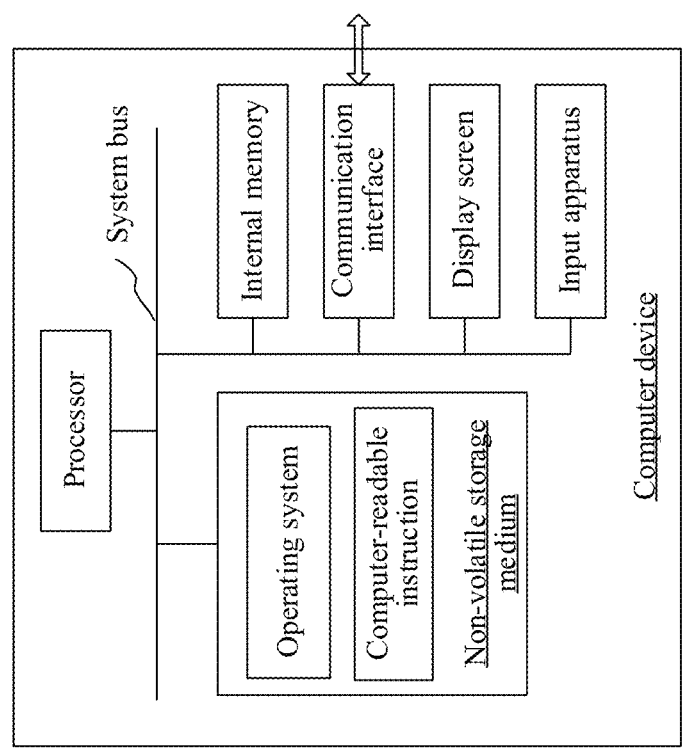
FIG. 19 is a diagram of an internal structure of a computer device according to some embodiments.

A person skilled in the art may understand that, the structure shown in FIG. 18 and FIG. 19 is only a block diagram of a part of a structure related to a solution of this application and does not limit the computer device to which the solution of this application is applied. Specifically, the computer device may include more or fewer components than those in the drawings, or some components are combined, or a different component deployment is used.

In some embodiments, a computer device is further provided, including a memory and one or more processors. The memory stores computer readable instructions, the computer readable instructions, when executed by the processors, causing the one or more processors to perform the steps of the various method embodiments described above.

In some embodiments, one or more non-volatile (e.g., non-transitory) readable storage medium are provided. The one or more non-volatile readable storage medium store computer-readable instructions, the computer-readable instructions, when executed by one or more processors, causing the one or more processors to perform the steps of the various method embodiments described above.

In some embodiments, a computer program product is further provided. The computer program product includes computer-readable instructions, the computer-readable instructions, when executed by a processor, implementing the steps of the various method embodiments described above.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of the present disclosure. It should be noted that a person of ordinary skill in the art may make various changes and improvements without departing from the ideas of this application, which shall all fall within the protection scope of this application. Therefore, the protection scope of the patent of this application shall be subject to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs terrain generation and/or feature extraction. In practical application, the foregoing functions may be allocated to and completed by different functional modules according to requirements, that is, an inner structure of a device is divided into different functional modules to implement all or a part of the functions described above.

What is claimed is:

1. A virtual scene generation method, performed by a computer device, the method comprising:
   acquiring three-dimensional point cloud space data of a real scene in real world and scene distribution data corresponding to the real scene, wherein the scene distribution data comprises point set data that indicates position and size information of scene objects in the real scene and the scene distribution data is distinct from the three-dimensional point cloud space data;
   performing alignment on a scene area corresponding to the scene distribution data and a scene area corresponding to the three-dimensional point cloud space data to obtain a scene aligned area;
   selecting the scene distribution data matching the scene aligned area from the scene distribution data to obtain aligned scene distribution data, further comprising:
      selecting complete point set data from the scene distribution data when the scene aligned area has complete point set data of a first object type of scene objects;
      eliminating the complete point set data from the scene distribution data when the scene aligned area has incomplete point set data of the first object type of scene objects;
      selecting point set data of a second object type of scene objects in the scene aligned area from the scene distribution data;
   extracting terrain features from the three-dimensional point cloud space data;
   generating a three-dimensional terrain model of the real scene according to the terrain features;
   extracting, from the aligned scene distribution data, scene object features of the scene objects in the real scene based on the position and size information of the scene objects in the real scene; and
   generating scene object models corresponding to the scene object features in the three-dimensional terrain model to obtain a virtual scene corresponding to the real scene.

2. The method according to claim 1, wherein:
   the three-dimensional space data comprises terrain space data; and
   extracting terrain features from the three-dimensional space data comprises:
      determining the terrain features according to height differences between adjacent terrain points in the terrain space data.

3. The method according to claim 2, wherein generating the three-dimensional terrain model according to the terrain features comprises:
   determining terrain types corresponding to terrain areas in the terrain space data according to the terrain features;
   adding corresponding terrain surface attribute information to the terrain areas according to the terrain types; and
   generating the three-dimensional terrain model according to the terrain space data and the added terrain surface attribute information.

4. The method according to claim 1, wherein:
   the three-dimensional space data comprises cover object space data; and
   the method further comprises:
      determining a terrain surface coverage area in the three-dimensional terrain model according to the cover object space data; and
      generating terrain surface cover objects in the terrain surface coverage area.

5. The method according to claim 4, wherein determining the terrain surface coverage area comprises:
   determining terrain points corresponding to terrain surface cover points in the cover object space data in the three-dimensional terrain model;
   selecting target terrain surface cover points according to height differences between the terrain surface cover points and the corresponding terrain points;
   determining overlapping areas of expansion areas and the three-dimensional terrain model, the expansion areas being areas obtained after expansion based on the target terrain surface cover points; and
   determining the terrain surface coverage area in the three-dimensional terrain model according to the overlapping areas.

6. The method according to claim 4, wherein generating the terrain surface cover objects in the terrain surface coverage area comprises:
   determining generation parameter information of the terrain surface cover objects in the terrain surface coverage area; and generating the terrain surface cover objects in the terrain surface coverage area according to the generation parameter information.

7. The method according to claim 1, wherein extracting the scene object features comprises:
   determining positions and heights of the scene objects in the real scene in the three-dimensional terrain model based on the scene distribution data;
   generating three-dimensional scene object data corresponding to the scene objects according to the positions and the heights; and
   extracting the scene object features of the scene objects from the three-dimensional scene object data.

8. The method according to claim 7, wherein determining the positions and heights of the scene objects in the real scene comprises:
   determining the positions and the heights of the scene objects in the three-dimensional terrain model according to original positions when the scene distribution data includes the original positions of the scene objects in the real scene.

9. The method according to claim 1, wherein generating the scene object models comprises:
   generating initial scene object models corresponding to the scene objects according to the scene object features;
   adding scene object attribute information conforming to object types to the initial scene object models according to the object types of the scene objects to obtain the scene object models matched with the scene objects; and
   adding the scene object models to the three-dimensional terrain model to obtain the virtual scene corresponding to the real scene.

10. The method according to claim 9, wherein adding the scene object models to the three-dimensional terrain model to obtain the virtual scene corresponding to the real scene comprises:
    determining corresponding terrain areas of the scene object models in the three-dimensional terrain model;
    performing smoothing treatment on the terrain areas to obtain smoothened terrain areas; and
    adding the scene object models to the smoothened terrain areas in the three-dimensional terrain model to obtain the virtual scene corresponding to the real scene.

11. The method according to claim 10, wherein determining the corresponding terrain areas of the scene object models in the three-dimensional terrain model comprises:
    determining a position area corresponding to the scene object models in the three-dimensional terrain model and an adjacent area of the position area as the terrain areas corresponding to the scene object models.

12. A computer device, comprising:
    one or more processors; and
    memory storing one or more programs, the one or more programs comprising instructions that, when executed by the one or more processors, cause the one or more processors to perform operations comprising:
    acquiring three-dimensional point cloud space data of a real scene in real world and scene distribution data corresponding to the real scene, wherein the scene distribution data comprises point set data that indicates position and size information of scene objects in the real scene and the scene distribution data is distinct from the three-dimensional point cloud space data;
    performing alignment on a scene area corresponding to the scene distribution data and a scene area corresponding to the three-dimensional point cloud space data to obtain a scene aligned area;
    selecting the scene distribution data matching the scene aligned area from the scene distribution data to obtain aligned scene distribution data, further comprising:
       selecting complete point set data from the scene distribution data when the scene aligned area has complete point set data of a first object type of scene objects;
       eliminating the complete point set data from the scene distribution data when the scene aligned area has incomplete point set data of the first object type of scene objects;
       selecting point set data of a second object type of scene objects in the scene aligned area from the scene distribution data;
    extracting terrain features from the three-dimensional point cloud space data;
    generating a three-dimensional terrain model of the real scene according to the terrain features;
    extracting, from the aligned scene distribution data, scene object features of the scene objects in the real scene based on the position and size information of the scene objects in the real scene; and
    generating scene object models corresponding to the scene object features in the three-dimensional terrain model to obtain a virtual scene corresponding to the real scene.

13. The computer device according to claim 12, wherein:
    the three-dimensional space data comprises terrain space data; and
    extracting terrain features from the three-dimensional space data comprises:
       determining the terrain features according to height differences between adjacent terrain points in the terrain space data.

14. The computer device according to claim 12, wherein:
    the three-dimensional space data comprises cover object space data; and
    the operations further comprise:
       determining a terrain surface coverage area in the three-dimensional terrain model according to the cover object space data; and
       generating terrain surface cover objects in the terrain surface coverage area.

15. The computer device according to claim 12, wherein extracting the scene object features comprises:
    determining positions and heights of the scene objects in the real scene in the three-dimensional terrain model based on the scene distribution data;
    generating three-dimensional scene object data corresponding to the scene objects according to the positions and the heights; and
    extracting the scene object features of the scene objects from the three-dimensional scene object data.

16. The computer device according to claim 12, wherein generating the scene object models comprises:
    generating initial scene object models corresponding to the scene objects according to the scene object features;
    adding scene object attribute information conforming to object types to the initial scene object models according to the object types of the scene objects to obtain the scene object models matched with the scene objects; and
    adding the scene object models to the three-dimensional terrain model to obtain the virtual scene corresponding to the real scene.

17. A non-transitory computer-readable storage medium, storing one or more instructions, the one or more instructions, when executed by one or more processors of a computer device, cause the computer device to perform operations comprising:
- acquiring three-dimensional point cloud space data of a real scene in real world and scene distribution data corresponding to the real scene, wherein the scene distribution data comprises point set data that indicates position and size information of scene objects in the real scene and the scene distribution data is distinct from the three-dimensional point cloud space data;
- performing alignment on a scene area corresponding to the scene distribution data and a scene area corresponding to the three-dimensional point cloud space data to obtain a scene aligned area;
- selecting the scene distribution data matching the scene aligned area from the scene distribution data to obtain aligned scene distribution data, further comprising:
  - selecting complete point set data from the scene distribution data when the scene aligned area has complete point set data of a first object type of scene objects;
  - eliminating the complete point set data from the scene distribution data when the scene aligned area has incomplete point set data of the first object type of scene objects;
  - selecting point set data of a second object type of scene objects in the scene aligned area from the scene distribution data;
- extracting terrain features from the three-dimensional point cloud space data;
- generating a three-dimensional terrain model of the real scene according to the terrain features;
- extracting, from the aligned scene distribution data, scene object features of the scene objects in the real scene based on the position and size information of the scene objects in the real scene; and
- generating scene object models corresponding to the scene object features in the three-dimensional terrain model to obtain a virtual scene corresponding to the real scene.

18. The non-transitory computer-readable storage medium according to claim 17, wherein generating the scene object models comprises:
- generating initial scene object models corresponding to the scene objects according to the scene object features;
- adding scene object attribute information conforming to object types to the initial scene object models according to the object types of the scene objects to obtain the scene object models matched with the scene objects; and
- adding the scene object models to the three-dimensional terrain model to obtain the virtual scene corresponding to the real scene.

19. The non-transitory computer-readable storage medium according to claim 17, wherein extracting the scene object features comprises:
- determining positions and heights of the scene objects in the real scene in the three-dimensional terrain model based on the scene distribution data;
- generating three-dimensional scene object data corresponding to the scene objects according to the positions and the heights; and
- extracting the scene object features of the scene objects from the three-dimensional scene object data.

* * * * *